(12) United States Patent
Palin et al.

(10) Patent No.: US 8,929,816 B2
(45) Date of Patent: *Jan. 6, 2015

(54) MULTIPLE APPARATUS SELECTION VIA TOUCH

(75) Inventors: Arto Palin, Viiala (FI); Jari Nikara, Lempäälä (FI)

(73) Assignee: Nokia Corporation, Espoo (FI)

(*) Notice: Subject to any disclaimer, the term of this patent is extended or adjusted under 35 U.S.C. 154(b) by 0 days.

This patent is subject to a terminal disclaimer.

(21) Appl. No.: 13/223,550

(22) Filed: Sep. 1, 2011

(65) Prior Publication Data

US 2012/0289159 A1    Nov. 15, 2012

Related U.S. Application Data

(63) Continuation-in-part of application No. 13/107,145, filed on May 13, 2011.

(51) Int. Cl.
| | | |
|---|---|---|
| *H04B 7/00* | (2006.01) | |
| *H04B 17/02* | (2006.01) | |
| *H04B 1/18* | (2006.01) | |
| *H04W 48/14* | (2009.01) | |

(52) U.S. Cl.
CPC .................................. *H04W 48/14* (2013.01)
USPC ..................... 455/41.2; 455/134; 455/161.3

(58) Field of Classification Search
USPC ............ 455/41.1–41.3, 436, 451, 552.1, 509, 455/557, 67.11, 134, 161.3; 370/254, 338
See application file for complete search history.

(56) References Cited

U.S. PATENT DOCUMENTS

| | | |
|---|---|---|
| 5,530,702 A | 6/1996 | Palmer et al. |
| 6,816,063 B2 | 11/2004 | Kubler et al. |
| 6,892,052 B2 | 5/2005 | Kotola et al. |
| 7,075,412 B1 | 7/2006 | Reynolds et al. |
| 7,151,764 B1 | 12/2006 | Heinonen et al. |
| 7,519,682 B2 | 4/2009 | Smith et al. |
| 7,775,432 B2 | 8/2010 | Jalkanen et al. |
| 8,210,433 B2 | 7/2012 | Jalkanen et al. |

(Continued)

FOREIGN PATENT DOCUMENTS

| | | |
|---|---|---|
| DE | 102010019328 | 12/2010 |
| EP | 2073514 | 6/2009 |

(Continued)

OTHER PUBLICATIONS

13107145_20140320_nokia-symbian3-developers-librar.*

(Continued)

*Primary Examiner* — Andrew Wendell
*Assistant Examiner* — Cindy Trandai
(74) *Attorney, Agent, or Firm* — Locke Lord LLP

(57) ABSTRACT

A system for expediting connection establishment between apparatuses. In at least one example implementation, an apparatus may transmit discovery messages and may receive response messages. If any of the response messages are determined to satisfy predetermined response criteria, the apparatus may further determine if any of these response messages (e.g., the messages that were determined to satisfy the predetermined response criteria) are associated with apparatuses that satisfy selection criteria for the selection of multiple apparatuses that may, in some instances, operate together as a group. Apparatuses that are determined to satisfy the multiple selection criteria may then be selected, wherein connection establishment is expedited for the selected apparatuses.

22 Claims, 13 Drawing Sheets

(56) References Cited

U.S. PATENT DOCUMENTS

| | | | |
|---|---|---|---|
| 2001/0045460 A1 | 11/2001 | Reynolds et al. | |
| 2002/0021809 A1 | 2/2002 | Salo et al. | |
| 2002/0022961 A1 | 2/2002 | Sepanaho | |
| 2002/0023264 A1 | 2/2002 | Aaltonen et al. | |
| 2002/0069406 A1 | 6/2002 | Aaltonen et al. | |
| 2002/0071436 A1* | 6/2002 | Border et al. | 370/395.32 |
| 2002/0087997 A1 | 7/2002 | Dahlstrom | |
| 2002/0191998 A1 | 12/2002 | Cremon et al. | |
| 2003/0043041 A1 | 3/2003 | Zeps et al. | |
| 2003/0084177 A1 | 5/2003 | Mulligan | |
| 2003/0097304 A1 | 5/2003 | Hunt | |
| 2003/0120745 A1 | 6/2003 | Katagishi et al. | |
| 2003/0134653 A1 | 7/2003 | Sarkkinen et al. | |
| 2003/0220765 A1 | 11/2003 | Overy et al. | |
| 2004/0081117 A1* | 4/2004 | Malek et al. | 370/324 |
| 2004/0193676 A1 | 9/2004 | Marks | |
| 2004/0203414 A1 | 10/2004 | Satou et al. | |
| 2004/0225199 A1 | 11/2004 | Evanyk et al. | |
| 2005/0054290 A1 | 3/2005 | Logan et al. | |
| 2005/0073522 A1* | 4/2005 | Aholainen et al. | 345/440 |
| 2007/0047505 A1 | 3/2007 | Wassingbo | |
| 2007/0141984 A1 | 6/2007 | Kuehnel et al. | |
| 2007/0275746 A1 | 11/2007 | Bitran | |
| 2007/0291710 A1* | 12/2007 | Fadell | 370/338 |
| 2008/0004021 A1* | 1/2008 | Sanjay | 455/436 |
| 2008/0055632 A1 | 3/2008 | Oshiumi et al. | |
| 2008/0090606 A1 | 4/2008 | Hwang et al. | |
| 2008/0146151 A1 | 6/2008 | Lyu et al. | |
| 2008/0242220 A1 | 10/2008 | Wilson et al. | |
| 2008/0311957 A1 | 12/2008 | Jantunen et al. | |
| 2009/0029728 A1 | 1/2009 | Shen et al. | |
| 2009/0161582 A1* | 6/2009 | Kammer et al. | 370/254 |
| 2009/0163198 A1* | 6/2009 | Ray et al. | 455/425 |
| 2009/0180519 A1* | 7/2009 | Lee et al. | 375/130 |
| 2009/0215397 A1 | 8/2009 | Thorn et al. | |
| 2009/0276439 A1 | 11/2009 | Rosenblatt et al. | |
| 2010/0082784 A1 | 4/2010 | Rosenblatt et al. | |
| 2010/0093280 A1 | 4/2010 | Ahn et al. | |
| 2010/0105328 A1* | 4/2010 | Ahn et al. | 455/41.2 |
| 2010/0120364 A1* | 5/2010 | Lee et al. | 455/41.2 |
| 2010/0144274 A1* | 6/2010 | Mcdowall et al. | 455/41.2 |
| 2010/0211698 A1 | 8/2010 | Krishnaswamy | |
| 2010/0241529 A1 | 9/2010 | Kim | |
| 2010/0250135 A1* | 9/2010 | Li et al. | 701/300 |
| 2010/0268828 A1* | 10/2010 | Pahlavan et al. | 709/227 |
| 2010/0319055 A1* | 12/2010 | Tamura et al. | 726/4 |
| 2011/0140864 A1 | 6/2011 | Bucci | |
| 2011/0235624 A1 | 9/2011 | Scott et al. | |
| 2012/0015605 A1 | 1/2012 | Sole | |
| 2012/0017257 A1 | 1/2012 | Lee et al. | |
| 2012/0081235 A1* | 4/2012 | Nadeem et al. | 340/933 |
| 2012/0169473 A1 | 7/2012 | Jalkanen et al. | |

FOREIGN PATENT DOCUMENTS

| | | |
|---|---|---|
| EP | 2355563 | 8/2011 |
| EP | 2424281 | 2/2012 |
| WO | WO0051293 | 8/2000 |
| WO | 0067221 | 11/2000 |
| WO | WO 0145319 | 6/2001 |
| WO | WO 0152179 | 7/2001 |
| WO | WO 0211074 | 2/2002 |
| WO | WO2007040398 | 4/2007 |
| WO | WO2009013646 | 1/2009 |

OTHER PUBLICATIONS

Office Action for Korean Application No. 10-2006-7009441 dated Apr. 23, 2007.
Notice of Allowance for Korean Application No. 10-2006-7009441 dated Jan. 7, 2008.
European Search Report for EP Application No. 08006467.8-2412 / 1965555 dated Nov. 2, 2011.
Widmer, P., "Smart Box Software Framework", Vision Document, Apr. 7, 2003, 23 pages.
International Search Report for International Application No. PCT/FI2012/050442—Date of Completion of Search: Sep. 18, 2012—4 pages.
Written Opinion of the International Searching Authority for International Application No. PCT/FI2012/050442—Date of Completion of Opinion: Sep. 18, 2012—7 pages.
Radio Frequency Identification RFID—A basic primer; AIM Inc. White Paper; Aug. 23, 2001; 17 pages; 1.2; The association of the Automatic Identification and Data Capture Industry (AIM Inc.); WP-98002R2.
Notice and Filing of Opposition in European Patent 1 685 689, Apr. 24, 2009.
Reply to Notice of Opposition in European Patent 1 685 689, Sep. 28, 2009.
International Search Report for International Application No. PCT/FI2012/050431—Date of Completion of Search: Sep. 3, 2012—4 pages.
Written Opinion of the International Searching Authority for International Application No. PCT/FI2012/050431—Date of Completion of Opinion: Sep. 3, 2012—6 pages.
Communication with European Search Report of European Patent Application No. 12166717.4-2412—Date of Completion of Search: Jul. 12, 2012, 10 pages.
English Language Machine Translation of German Patent Application Publication No. DE 10 2010 019 328—16 pages.
Substantive Examination Adverse Report with Search Report for Malaysian Patent Application No. PI2012002048, Sep. 15, 2014, 4 pages.
Notice and Filing of Opposition in European Patent 1 685 689, Apr. 24, 2009, 11 pages.
Reply to Notice of Opposition in European Patent 1 685 689, Sep. 28, 2009, 11 pages.

* cited by examiner

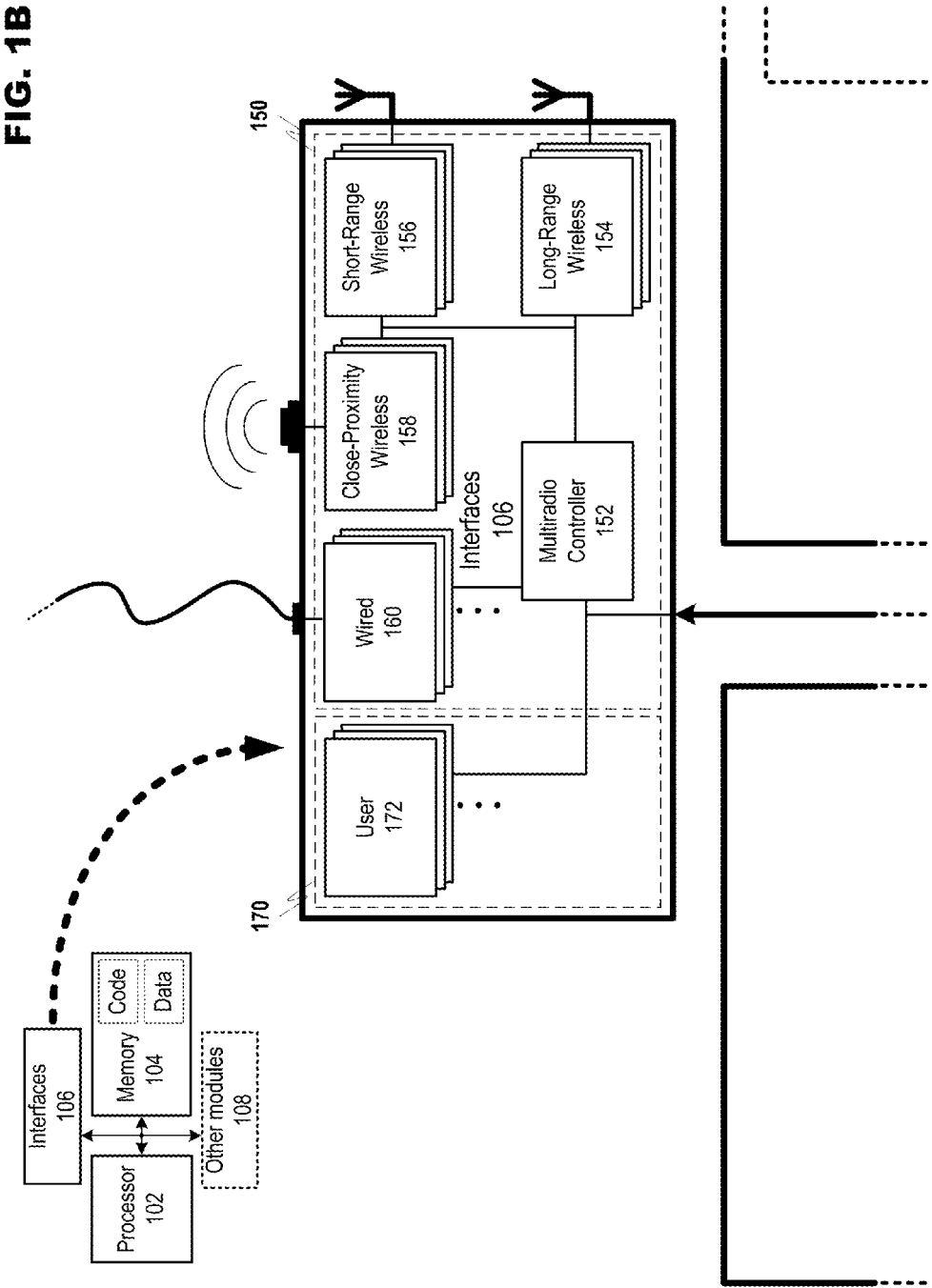

MULTIPLE APPARATUS SELECTION VIA TOUCH

PRIORITY

The present U.S. Patent Application is a Continuation-In-Part (CIP) of co-pending U.S. patent application Ser. No. 13/107,145, entitled "TOUCH INQUIRY," that was filed May 13, 2011. The disclosure of the above-identified prior U.S. Patent Application, in entirety, is considered as being part of the present U.S. Patent Application, and thus, is incorporated herein by reference.

BACKGROUND

1. Field of Invention

The present invention relates to wireless communication, and in particular, to facilitating connection establishment between closely situated apparatuses.

2. Background

The ability of apparatuses to communicate wirelessly has progressed beyond the simple conveyance of voice information to encompass a multitude of electronic data types. For example, emerging wireless-enabled apparatuses may exchange textual data (e.g., text messages, emails, etc.), machine-readable data files, multimedia files, directional data, Internet-related data such as a webpage, etc. Electronic data may be conveyed over various wireless mediums, such as via long-range cellular architectures like Code Divisional Multiple Access (CDMA), Global System for Mobile communications (GSM), etc., via short-range wireless networking engaged over Bluetooth, wireless local area networking (WLAN), etc., or via direct device-to-device interactions over very short distances such as in instances of Near Field Communication (NFC).

The forms of communication available to wireless-enabled apparatuses may each have benefits making them appropriate for certain situations. For example, short-range wireless communications may operate in unregulated bandwidth between two or more apparatuses either directly or through a local master apparatus. Communication conducted via such mediums (e.g., Bluetooth, WLAN, etc.) may have benefits in that localized data transfers may occur relatively quickly with the ability to ensure data integrity and security during the transfer. For example, short-range wireless communication may allow for wireless-enabled peripherals (e.g., keyboards, headsets, etc.) to be employed with mobile wireless communication apparatuses for enhancing user experience. Such activity may occur alone or along with data (e.g., business cards, pictures, videos, sound files, etc.) being exchanged amongst these apparatuses without the need for support from long-range wireless networks that may be unavailable in some areas (e.g., indoors).

However, in addition to the above benefits, short-range wireless communications may also entail some configuration burden. As opposed to long-range wireless communications that may utilize a fixed configuration profile that may be recognized by any cell in the network, short-range wireless communications may need to be configured on a network-to-network basis. Therefore, users of apparatuses engaging in short-range wireless communication must have some knowledge of the configuration procedure in order to establish a short-range wireless connection, and even if the user has the requisite knowledge, the time and/or effort expended by the user in setting up the wireless connection may impact negatively on the overall experience of the user.

SUMMARY

Various example embodiments of the present invention may be directed to a method, apparatus, computer program product and system for expediting connection establishment between apparatuses. In at least one example implementation, an apparatus may transmit discovery messages (e.g., via wireless communication) and may receive response messages. If any of the response messages are determined to satisfy predetermined response criteria, the apparatus may further determine if any of these response messages (e.g., the messages that were determined to satisfy the predetermined response criteria) are associated with apparatuses that satisfy selection criteria for the selection of multiple apparatuses that may, in some instances, operate together as a group. Apparatuses that are determined to satisfy the multiple selection criteria may then be selected, wherein connection establishment is expedited for the selected apparatuses.

Example predetermined response criteria may comprise the received messages including certain types of messages, in wireless operation at least one of the certain types of messages having a signal strength that is measured to be at or above a predetermined signal strength level. Example multiple selection criteria may comprise a selecting a certain number of apparatuses. In such an instance the multiple selection criteria may be satisfied when the certain number of apparatuses have been selected. An alternative example multiple selection criteria may comprise selecting apparatuses configured to provide certain functionality. The alternative example multiple selection criteria may then be satisfied when the selected apparatuses are able to provide the certain functionality. In either of the above examples of multiple selection criteria, the selected apparatuses may, in some instances, be selected in order to interact in a group configuration.

When multiple selection is being performed, a determination of whether selection has been completed may occur after each apparatus has been selected. After it is determined that selection has been completed, connection establishment may be expedited for the selected apparatuses. For example, wired and/or wireless connections may be established between the apparatus that transmitted the discovery messages and some or all of the selected apparatuses. It may also be possible for wireless connections to be established directly between apparatuses other than the apparatus that transmitted the discovery messages. For example, connection establishment information may be provided to selected apparatuses from the discovering apparatus as part of the selection process, the connection establishment information allowing selected apparatuses to establish wired and/or wireless connections to other apparatuses (e.g., to other selected apparatuses). Apparatus search and selection may typically be based on wireless techniques, such as those integrated into Bluetooth, but selected apparatuses may also host and pass information corresponding to other apparatuses communicating via wired connections. The decision as to whether selected apparatuses establish direct connections to other apparatuses may also be made by the selected apparatuses based on, for example, connectivity-related technology information included in the connection establishment information.

The foregoing summary includes example embodiments of the present invention that are not intended to be limiting. The above embodiments are used merely to explain selected aspects or steps that may be utilized in implementations of the present invention. However, it is readily apparent that one or more aspects, or steps, pertaining to an example embodiment can be combined with one or more aspects, or steps, of other embodiments to create new embodiments still within the scope of the present invention. Therefore, persons of ordinary skill in the art would appreciate that various embodiments of the present invention may incorporate aspects from other embodiments, or may be implemented in combination with other embodiments.

DESCRIPTION OF DRAWINGS

The invention will be further understood from the following description of various example embodiments, taken in conjunction with appended drawings, in which:

FIG. 1B discloses further detail regarding an example apparatus configuration that may be utilized when implementing the various embodiments of the present invention.

DESCRIPTION OF EXAMPLE EMBODIMENTS

Figure 1A:
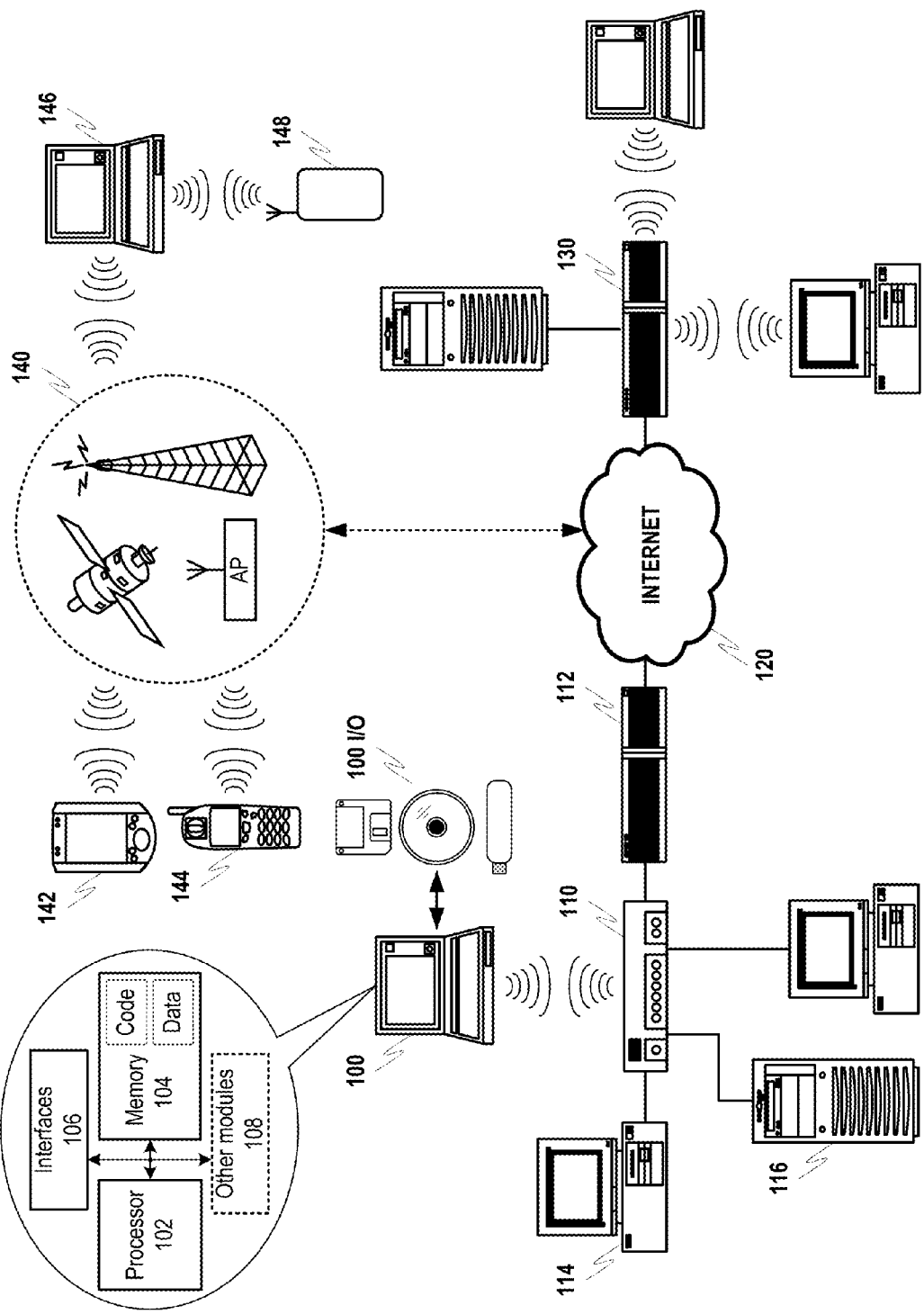
FIG. 1A discloses example apparatuses, systems, configurations, etc. that may be utilized when implementing the various embodiments of the present invention.

While the invention has been described below in terms of a multitude of example embodiments, various changes can be made therein without departing from the spirit and scope of the invention, as described in the appended claims.

I. Example System with which Embodiments of the Present Invention May be Implemented An example of a system that is usable for implementing various embodiments of the present invention is disclosed in FIG. 1A. The system comprises elements that may be included in, or omitted from, configurations depending, for example, on the requirements of a particular application, and therefore, is not intended to limit present invention in any manner.

Computing device 100 may be, for example, a laptop computer. Elements that represent basic example components comprising functional elements in computing device 100 are disclosed at 102-108. Processor 102 may include one or more devices configured to execute instructions. In at least one scenario, the execution of program code (e.g., groups of computer-executable instructions stored in a memory) by processor 102 may cause computing device 100 to perform processes including, for example, method steps that may result in data, events or other output activities. Processor 102 may be a dedicated (e.g., monolithic) microprocessor device, or may be part of a composite device such as an ASIC, gate array, multi-chip module (MCM), etc.

Processor 102 may be electronically coupled to other functional components in computing device 100 via a wired or wireless bus. For example, processor 102 may access memory 104 in order to obtain stored information (e.g., program code, data, etc.) for use during processing. Memory 104 may generally include removable or fixed imbedded memories (e.g., non-transitory computer readable storage media) that operate in a static or dynamic mode. Further, memory 104 may include read only memories (ROM), random access memories (RAM), and rewritable memories such as Flash, EPROM, etc. Examples of removable storage media based on magnetic, electronic and/or optical technologies are shown at 100 I/O in FIG. 1A, and may serve, for instance, as a data input/output means for computing device 100. Code may include any interpreted or compiled computer language including computer-executable instructions. The code and/or data may be used to create software modules such as operating systems, communication utilities, user interfaces, more specialized program modules, etc.

One or more interfaces 106 may also be coupled to various components in computing device 100. These interfaces may allow for inter-apparatus communication (e.g., a software or protocol interface), apparatus-to-apparatus communication (e.g., a wired or wireless communication interface) and even apparatus to user communication (e.g., a user interface). These interfaces allow components within computing device 100, other apparatuses and users to interact with computing device 100. Further, interfaces 106 may communicate machine-readable data, such as electronic, magnetic or optical signals embodied on a computer readable medium, or may translate the actions of users into activity that may be understood by computing device 100 (e.g., typing on a keyboard, speaking into the receiver of a cellular handset, touching an icon on a touch screen device, etc.). Interfaces 106 may further allow processor 102 and/or memory 104 to interact with other modules 108. For example, other modules 108 may comprise one or more components supporting more specialized functionality provided by computing device 100.

Computing device 100 may interact with other apparatuses via various networks as further shown in FIG. 1A. For example, hub 110 may provide wired and/or wireless support to devices such as computer 114 and server 116. Hub 110 may be further coupled to router 112 that allows devices on the local area network (LAN) to interact with devices on a wide area network (WAN, such as Internet 120). In such a scenario, another router 130 may transmit information to, and receive information from, router 112 so that devices on each LAN may communicate. Further, all of the components depicted in this example configuration are not necessary for implementation of the present invention. For example, in the LAN serviced by router 130 no additional hub is needed since this functionality may be supported by the router.

Further, interaction with remote devices may be supported by various providers of short and long range wireless communication 140. These providers may use, for example, long range terrestrial-based cellular systems and satellite communication, and/or short-range wireless access points in order to provide a wireless connection to Internet 120. For example, personal digital assistant (PDA) 142 and cellular handset 144 may communicate with computing device 100 via an Internet connection provided by a provider of wireless communication 140. Similar functionality may be included in devices, such as laptop computer 146, in the form of hardware and/or software resources configured to allow short and/or long range wireless communication. Further, any or all of the disclosed apparatuses may engage in direct interaction, such as in the short-range wireless interaction shown between laptop 146 and wireless-enabled apparatus 148. Example wireless enabled apparatuses 148 may range from more complex standalone wireless-enabled devices to peripheral devices for supporting functionality in apparatuses like laptop 146.

Further detail regarding example interface component 106 disclosed with respect to computing device 100 in FIG. 1A is now discussed regarding FIG. 1B. As previously set forth, interfaces 106 may include interfaces both for communicating data to computing apparatus 100 (e.g., as identified at 150) and other types of interfaces 170 including, for example, user interface 172. A representative group of apparatus-level interfaces is disclosed at 150. For example, multiradio controller 152 may manage the interoperation of long range wireless interfaces 154 (e.g., cellular voice and data networks), short-range wireless interfaces 156 (e.g., Bluetooth and WLAN networks), close-proximity wireless interfaces 158 (e.g., for interactions where electronic, magnetic, electromagnetic and optical information scanners interpret machine-readable data), wired interfaces 160 (e.g., Ethernet), etc. The example interfaces shown in FIG. 1B have been presented only for the sake of explanation herein, and thus, are not intended to limit the various embodiments of the present invention to utilization of any particular interface. Embodiments of the present invention may also utilize interfaces that are not specifically identified in FIG. 1B.

Multiradio controller 152 may manage the operation of some or all of interfaces 154-160. For example, multiradio controller 152 may prevent interfaces that could interfere with each other from operating at the same time by allocating specific time periods during which each interface is permitted to operate. Further, multiradio controller 152 may be able to process environmental information, such as sensed interference in the operational environment, to select an interface that will be more resilient to the interference. These multiradio control scenarios are not meant to encompass an exhaustive list of possible control functionality, but are merely given as examples of how multiradio controller 152 may interact with interfaces 154-160 in FIG. 1B.

II. Example Apparatus Interaction

The conveyance of electronic information is no longer bound by the requirement of being first encoded on physical media for transfer. For example, data may go from creation to distribution to consumption by an end user without ever touching a game cartridge, compact disk (CD), digital video disk (DVD), etc. The removal of the physical medium as an intermediary has influenced the evolution of emerging electronic apparatuses in that traditional resources used for accessing (e.g., reading from and/or writing to) physical media are disappearing. This evolution has placed a new focus on the efficiency and ease-of use for device-to-device communication.

While wired communication may still provide for the reliable conveyance of data between stationary devices, mobile apparatus users demand flexibility without the encumbrances of cables, physical media, etc. While long-range wireless communication mediums may be able to route information between apparatuses, communication does not occur directly between the apparatuses (e.g., it is routed through the cellular base station architecture), which may result in costs to a user for access to a provider's licensed bandwidth, delays caused by indirect routing and traffic on the provider's network, and possible inaccessibility due to long-range wireless data networks not always being available (e.g., indoors). Alternatively, short-range wireless networks may be deemed a better solution in that they provide relatively quick and secure device-to-device communication.

However, short-range wireless communication may require initial configuration. This configuration may involve a user manipulating various menus in an apparatus in order to trigger communication modes that allow apparatuses participating in the wireless interaction to obtain communication configuration information needed for accessing the other apparatuses. For example, apparatuses communicating via Bluetooth may initially go through a "discovery" and then "pairing" processes during which participating apparatuses obtain apparatus identification, security, channel hopping, etc. information that is usable when accessing other apparatuses. These configuration activities take time and skill to complete, which may run contrary to growing user expectation for more immediate and automatic communication operations when utilizing their mobile apparatuses.

III. Example Apparatus Interaction

Figure 2:
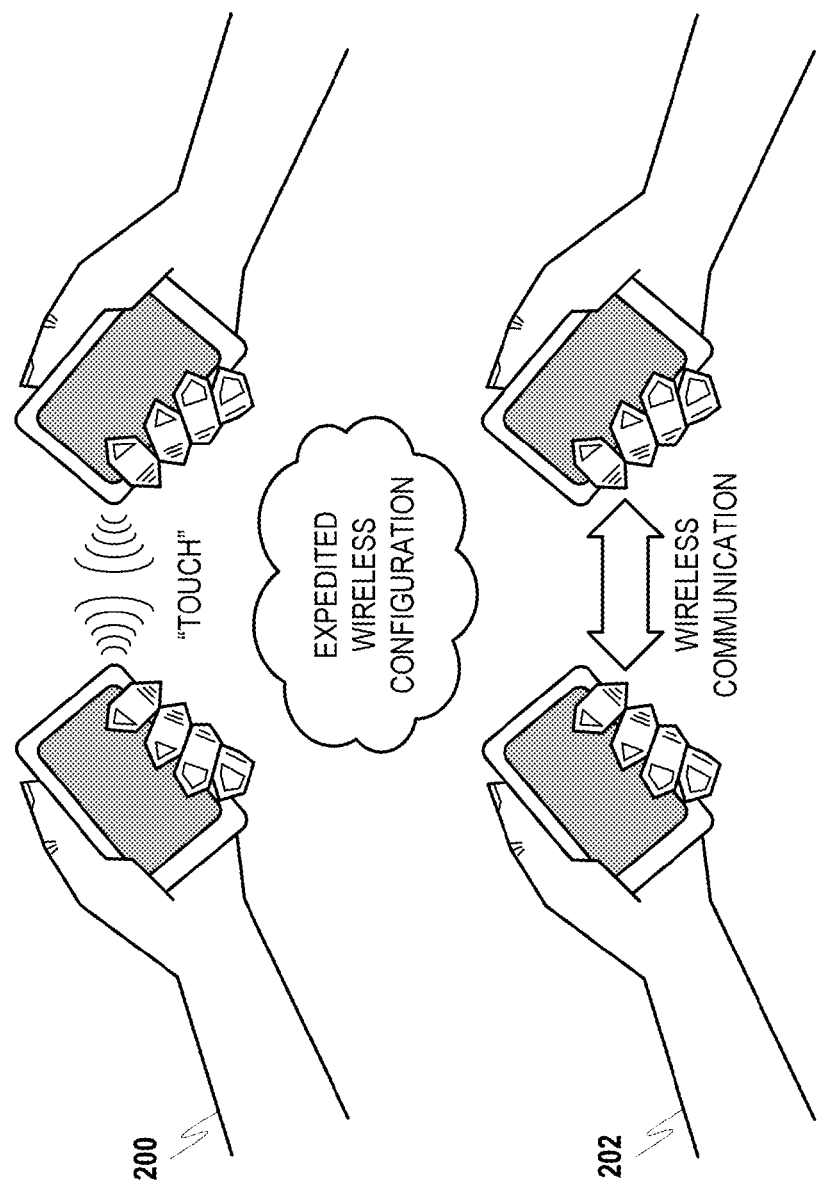
FIG. 2 discloses an example touch activity in accordance with at least one embodiments of the present invention.

In accordance with at least one embodiment of the present invention, an example wireless interaction is disclosed in FIG. 2 that, from the viewpoint of a user, may be desirable in that it may greatly simplify information exchanges. In the example shown in FIG. 2, two users may desire to wirelessly exchange electronic data between their mobile apparatuses. In step 200 the users may "touch" their apparatuses together, which may trigger some configuration to occur, and thus result in short-range wireless communication being established between the apparatuses in step 202. Touching, at least for the purposes of the current disclosure, does not require that the apparatuses actually come into physical contact with each other. Holding the apparatuses in close proximity for a short duration of time may be enough to trigger operations, after which the apparatuses may be separated and utilized within the communication range of whatever wireless communication medium is being utilized in order to support apparatus interaction. Such wireless interaction may be implemented utilizing various types of short-range wireless communication. While a multitude of wireless communication mediums are available, the various embodiments of the present invention disclosed herein use Bluetooth for the sake of explanation. The use of Bluetooth in the following disclosure is intended only as an example, and thus, other short-range wireless communication mediums may be employed in implementing the various embodiments.

Bluetooth is an example of a short-range communications technology that was originally intended to replace the cable (s) connecting portable and/or fixed electronic devices, but has grown to facilitate more general wireless communication between various apparatuses. Some of the key features of Bluetooth are robustness, low power consumption and low cost. Many of the features set forth in the Bluetooth core specification are optional, allowing for product differentiation. Existing Bluetooth interaction is based an inquiry method for device discovery, wherein an apparatus inquires about other apparatuses within transmission range and other devices interested in interacting with the inquiring apparatus respond to the inquiry. More specifically, an apparatus performing an inquiry scan is discoverable in that it may respond to inquiry packets that were transmitted from other devices in the inquiry state (e.g., trying to find discoverable devices). The inquiring device and any responding devices may then proceed to form a wireless network (e.g., a Bluetooth piconet) via which apparatus interaction is conducted.

Figure 3:
FIG. 3 discloses an example user interface display indication in accordance with at least one embodiment of the present invention.

During the inquiry process, when lower-level communication control resources in the inquiring apparatus receive a response from another apparatus, such as a frequency hopping synchronization (FHS) packet, the "found" apparatuses are typically reported to the host (e.g., upper-level processing resources in the inquiring apparatus). Even though multiple response messages may be received from each responding apparatus, it is recommended that the controller report each apparatus to the host only once. An example user interface (UI) operation for this process is disclosed in FIG. 3. In UI 300 the inquiry process has just started and two devices have responded. In UI 300 the inquiry process is complete and all responding apparatuses are displayed in the list, wherein each apparatus responding to the inquiry is listed only once.

In accordance with the various embodiments of the present invention, a usability problem may exist that may impede implementation of the touch system in that all apparatuses within range of the inquiring apparatus may respond to an inquiry. Given existing operations, the user of the inquiring apparatus would then have to recognize which responding apparatus is intended for the touch operation by recognizing its name as listed, for example, in UI 302. Identification may not be straightforward for the user due to, for instance, two or more responding apparatuses having the same default name (e.g., a name given to the device by the manufacturer that was not changed by the user), or the user of the inquiring apparatus not owning the target apparatus (e.g., as in the example of FIG. 2 where the second apparatus in the touch operation is owned by another user). The inquiring apparatus user would then be forced to ask the user of the second apparatus for the name of the target apparatus, which may not be known to many users.

In an existing solution to this problem the inquiring apparatus may measure the signal strength (e.g., Received Signal Strength Indication or RSSI) of each response message, which may be used in ordering the responding devices in UI 302 so that the apparatus with the highest measured signal strength is listed first (e.g., wherein the measured signal strength may correlate to the distance between the inquiring apparatus and the responding devices). However, this solution does not provide reliable results in that the measurement is limited to the first time the response message was received (e.g., since only one response is reported for each apparatus), and thus, the listing in UI 302 may be inaccurate for moving apparatuses such as shown in the touch example of FIG. 2. Further it may happen that, due to the irregularities in the wireless communication medium, the signal strengths of a single transmission might provide false results. Another possible solution may be to implement another form of wireless interaction having a substantially shorter transmission range such as radio frequency (RF) or infrared (IR), wherein communication over the secondary shorter wireless medium may serve as an indicator that the apparatuses are within touch range. However, an obvious barrier to implementing this approach is that hardware/software resources must be implemented to support a second form of wireless interaction that consumes space, power and processing, which are limited in mobile apparatuses.

IV. Example Touch Implementation

The various embodiments of the present invention do not suffer from the above deficiencies, and thus, may be able to implement continuous sensing for a device-to-device touch operations all within a single wireless communication medium. Touch operations, in at least one example implementation, may sense when apparatuses are being held or moved closer together and may trigger automated wireless connection establishment between only apparatuses that are within close proximity of each other. In particular, features that are available in the Bluetooth Specification 4.0 in regard to extended inquiry response (EIR) may be leveraged, wherein EIR responses shall be reported to the host multiple times during an inquiry scan. These features may also be enabled for apparatuses not configured to transmit EIR packets by requesting that these apparatuses are reported to a host more than once, which is allowed by the specification but not typically implemented.

Figure 4:
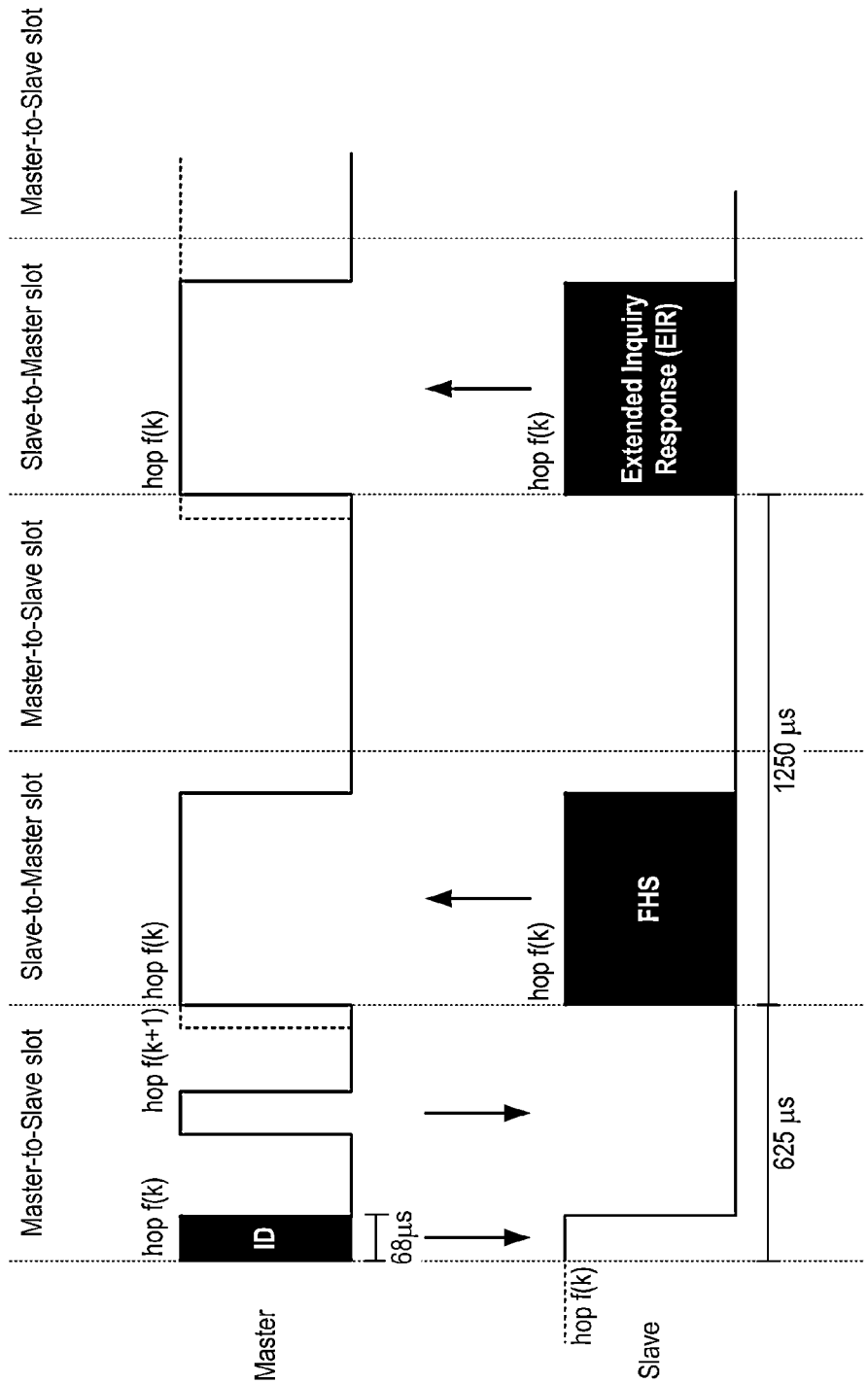
FIG. 4 discloses an example of wireless connection establishment in accordance with at least one embodiment of the present invention.

In the example of Bluetooth, inquiring apparatuses transmit ID packets that may be scanned by discoverable apparatuses. Discoverable apparatuses may then respond to the ID packets by transmitting an FHS packet. Discoverable apparatuses may further transmit an EIR packet after the FHS packet to deliver additional information including, for example, apparatus name, transmission (Tx) power, etc. An example wireless interaction is disclosed in FIG. 4. The default duration of a Bluetooth inquiry scan is 11.25 ms when performing a standard scan and 22.5 ms when performing an interlaced scan. The default value for an inquiry scan interval is 2.56 s. In the example of FIG. 4, the master-to-slave slot time may be 625 µs, and the total master-to-slave and slave-to-master slot time may be 1250 µs. An inquiry may be performed in order to find discoverable devices within transmission range. Apparatuses in a discoverable mode that receive inquiry packets (e.g., ID packets, typically having a duration of 68 µs) may transmit a response including a FHS packet. The FHS packet may comprise at least Bluetooth address, device class, whether an extended inquiry response follows, page scan mode and clock phase. Clock offset and address information may be utilized by inquiring devices to estimate channel information, hop(k), so that communication may be continued on future channels, hop f(k+1), in accordance with a frequency hop pattern. Estimating hop pattern information may allow the inquiring apparatus to follow the hops of the responding apparatus in order to establish a network connection with the responding apparatus.

An EIR procedure may also be executed by apparatuses responding to the inquiry. An extended inquiry response procedure may include the transmission of an EIR packet that may provide miscellaneous information above what is delivered in the basic inquiry response (e.g., in an FHS packet). An EIR packet may typically comprise information regarding, for example, services offered by the apparatus or some vendor specific information. The impending transmission of an EIR packet may be indicated by an EIR indicator bit that is set in the FHS packet. For example, device discovery may be expedited by user-friendly names not being sent in FHS packets, and thus, in order to show a user-friendly name for a discovered device the name must be provided in an EIR packet (e.g., unless the Bluetooth address is already mapped to the user-friendly name in the device memory). If it is indicated in an FHS packet that an EIR packet follows (e.g., the EIR bit is set), EIR packet transmission may commence in the next slave-to-master slot and may further extend over up to five (5)

slots. EIR packets are asynchronous connectionless link (ACL) packets of type DM1, DM3, DM5, DH1, DH3 or DH5.

Certain behaviors may be built into apparatuses in order to facilitate discovery. For example, in order to avoid repeated collisions between devices that simultaneously wake up in the same inquiry hop channel, a device shall back-off for a random period of time. Thus, if an apparatus receives an ID packet and responds by transmitting an FHS packet, it shall generate a random number, RAND, between 0 and MAX_RAND. MAX_RAND may be 1023 for scanning intervals≤1.28 s. For scanning intervals<1.28 s, MAX_RAND may be as small as 127. Profiles that use a special dedicated inquiry access code (DIAC) may select a MAX_RAND>1023 even when the scanning interval is ≥1.28 s. Discoverable apparatuses may return to a CONNECTION or STANDBY state for the duration of at least RAND timeslots. Before returning to the CONNECTION or STANDBY state, the device may go through the page scan sub-state.

After at least RAND timeslots, a discoverable apparatus shall add an offset of "1" to the phase in the inquiry hop sequence (e.g., the phase has a 1.28 s resolution) and then return to the inquiry scan sub-state again. If a discoverable apparatus is triggered again, it shall repeat the procedure using a new RAND. The offset to the clock accumulates each time an FHS packet is returned. During a probing window, a discoverable apparatus may respond multiple times, but on different frequencies and at different times. Reserved synchronous slots should have priority over response packets, wherein if a response packet overlaps with a reserved synchronous slot, it shall not be sent but waits for the next inquiry message. If a device has EIR data to transmit but the EIR packet overlaps with a reserved synchronous slot, the FHS packet may be sent with the EIR bit set to zero in accordance with the Bluetooth specification v4.0, incorporated herein by reference.

In view of the above, inquiry responses can be received by an inquiring apparatus within roughly 80 to 640 ms, depending on the inquiry scan interval of discovered devices. The random back-off for devices using scanning interval<1.28 s is from 0 to 79,375 ms and for other apparatuses (e.g., utilizing the default inquiry interval) is from 0 to 639,375 ms. In view of these operating characteristics, collecting responses from all apparatuses within communication range in an ideal (e.g., error-free) environment, the inquiry sub-state may have to last for 10.24 s unless the inquiring apparatus receives enough responses and aborts the inquiry sub-state earlier. In some instances (e.g., in an error-prone environment), the inquiring apparatus may also extend the inquiry sub-state to increase the probability of receiving all responses. As a consequence of an extended inquiry state and relatively short back-off times, multiple responses may be received from some or all of the responding apparatuses.

As mentioned above, more recent Bluetooth specifications are evolving to incorporate features that may be utilized in accordance with at least one embodiment of the present invention. For example, Section 7.1.1 of the Bluetooth Specification v4.0, entitled "Inquiry Command," states that "A device which responds during an inquiry or inquiry period should always be reported to the Host in an Inquiry Result event if the device has not been reported earlier during the current inquiry or inquiry period and the device has not been filtered out using the command Set Event Filter. If the device has been reported earlier during the current inquiry or inquiry period, it may or may not be reported depending on the implementation (depending on if earlier results have been saved in the BR/EDR Controller and in that case how many responses that have been saved). It is recommended that the BR/EDR Controller tries to report a particular device only once during an inquiry or inquiry period. When reporting discovered devices to the host, the RSSI parameter measured during the FHS packet by each responding device may be returned." Moreover, section 7.7.38 entitled "Extended Inquiry Result Event" states " . . . If an extended inquiry response packet from the same device is correctly received in a later response, another event shall be generated." Thus the lower-level communication controller may generate events for every an EIR packet it receives, regardless whether the inquiry response has already been reported. It is this constant event generation that may prove beneficial to implementing automated communication configuration and linking in various example implementations.

Figure 5:
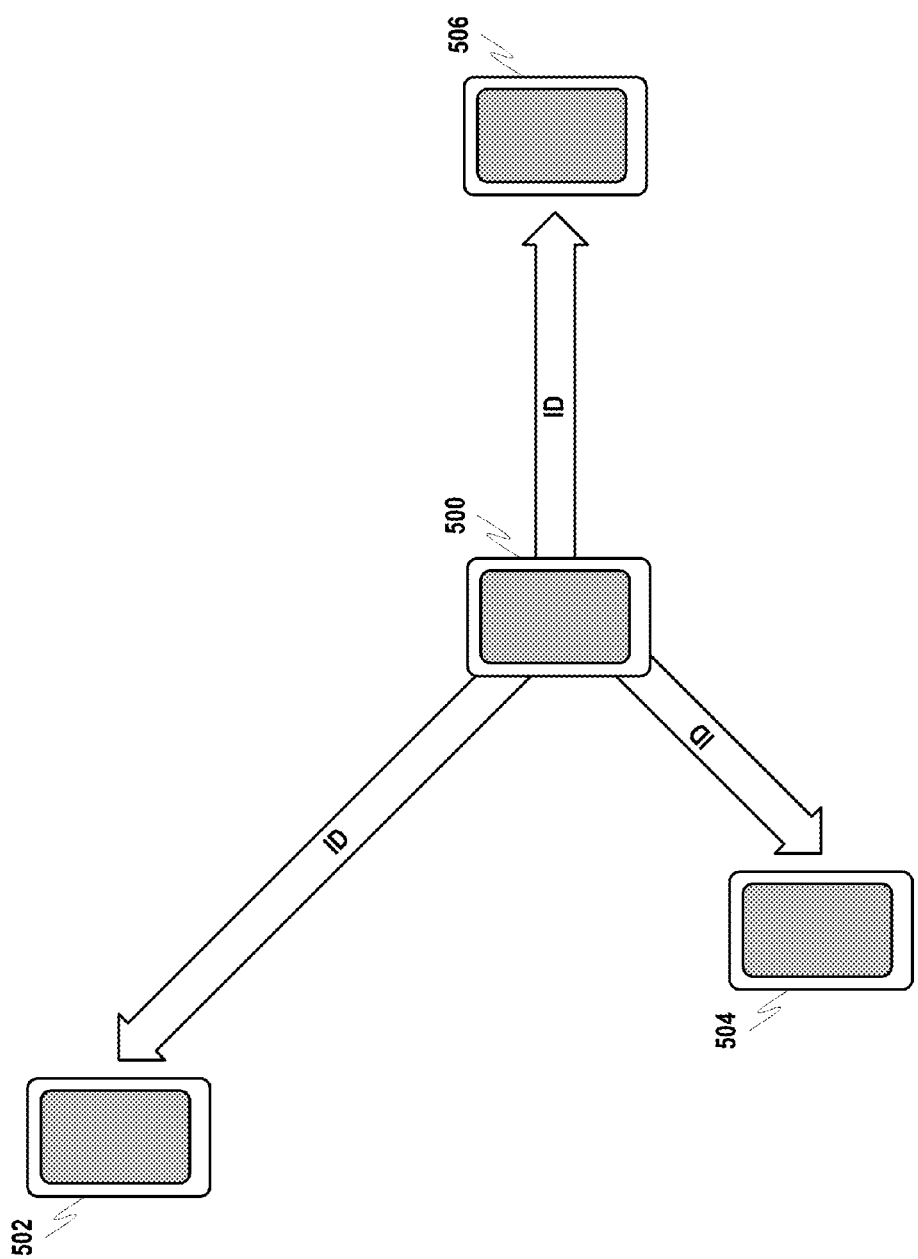
FIG. 5 discloses an example ID packet transmission in accordance with at least one embodiment of the present invention.

For example, four apparatuses 500-506 may be within communication range of each other as disclosed in FIG. 5. Apparatuses 500-506 may all be capable of communicating utilizing the same wireless communication medium (e.g., Bluetooth). In an example usage scenario, the user of apparatus 500 may desire to exchange data (e.g., business cards, pictures, music or multimedia files, etc.) with apparatus 506. Apparatus 500 may then enter an inquiry mode where ID packets are transmitted. The ID packet can be general inquiry access code packets (GIAC) or DIAC packets. Apparatuses 502-506 may then receive these ID packets.

Figure 6:
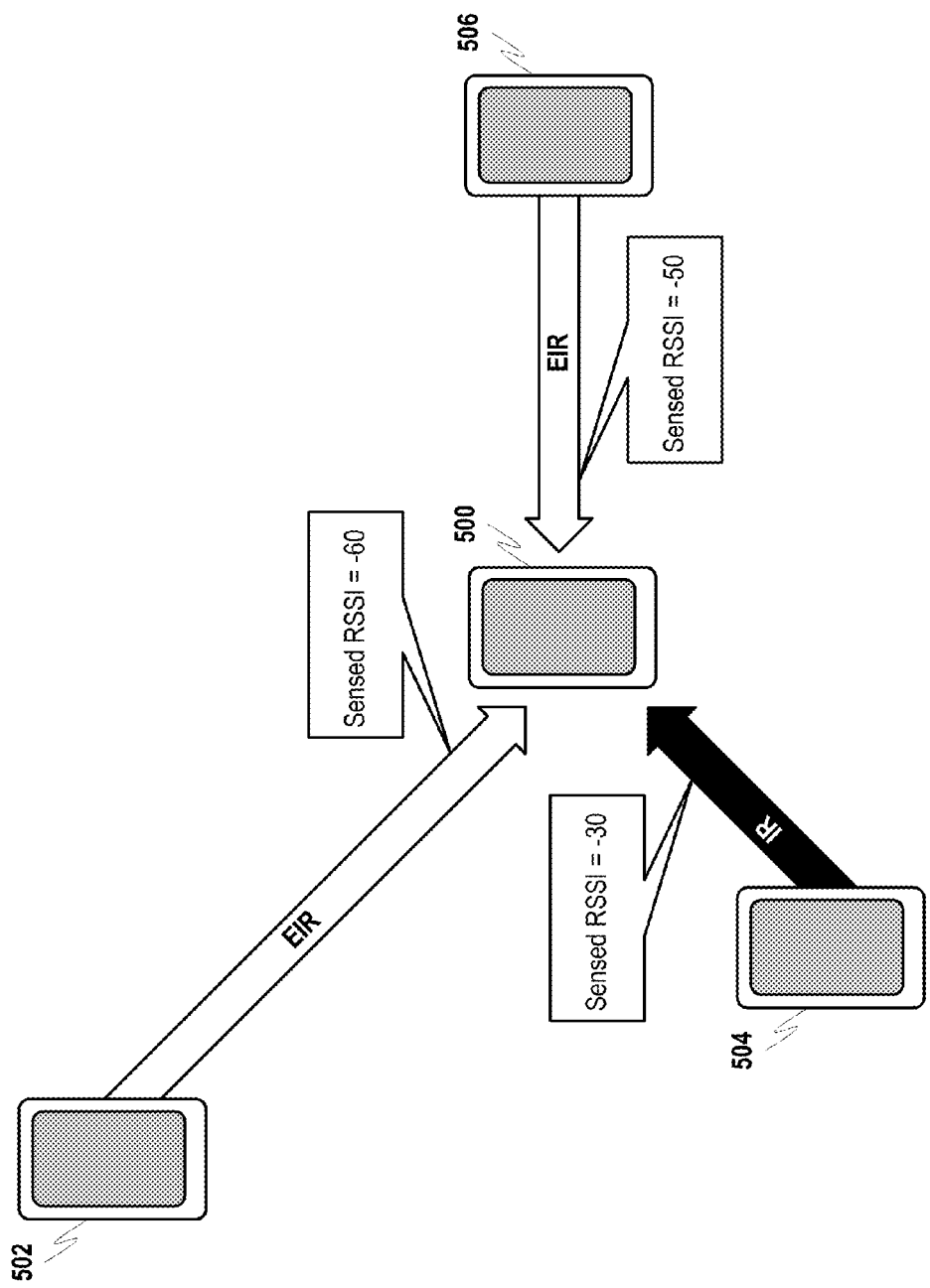
FIG. 6 discloses an example of signal strength measurement in accordance with at least one embodiment of the present invention.

In FIG. 6 apparatuses 502-506 may transmit packets responding to the ID packets received in FIG. 5. In particular, apparatuses 502 and 506 may transmit an EIR (e.g., an FHS packet followed by an EIR packet), while apparatus 504 may only transmit an inquiry response (IR) including just an FHS packet. The host in apparatus 500 may receive EIR events triggered by the responses of apparatuses 502 and 506, but not 504. In accordance with at least one embodiment of the present invention, this lack of EIR event reporting for apparatus 504 may be utilized as an initial filter for excluding apparatus 504 as a potential touch apparatus (e.g., apparatuses that do not transmit EIR packets are not touch apparatuses). However, it is important to note that other embodiments of the present invention may be configured for apparatuses that do not have the ability to send EIR packets. A system where a lack of EIR response is utilized as a filter is just one example.

The reported EIR events may include RSSI measurement values as shown, for example, with respect to apparatuses 502 and 506. From the RSSI values the host in apparatus 500 may detect when a device is most likely in "touching range" (e.g., within a distance from the inquiring apparatus that indicates touching-related operations should be executed). For example, there can be predetermined response criteria including one or more events indicating that an apparatus is within touching range is required to verify that the device is close enough.

Figure 7:
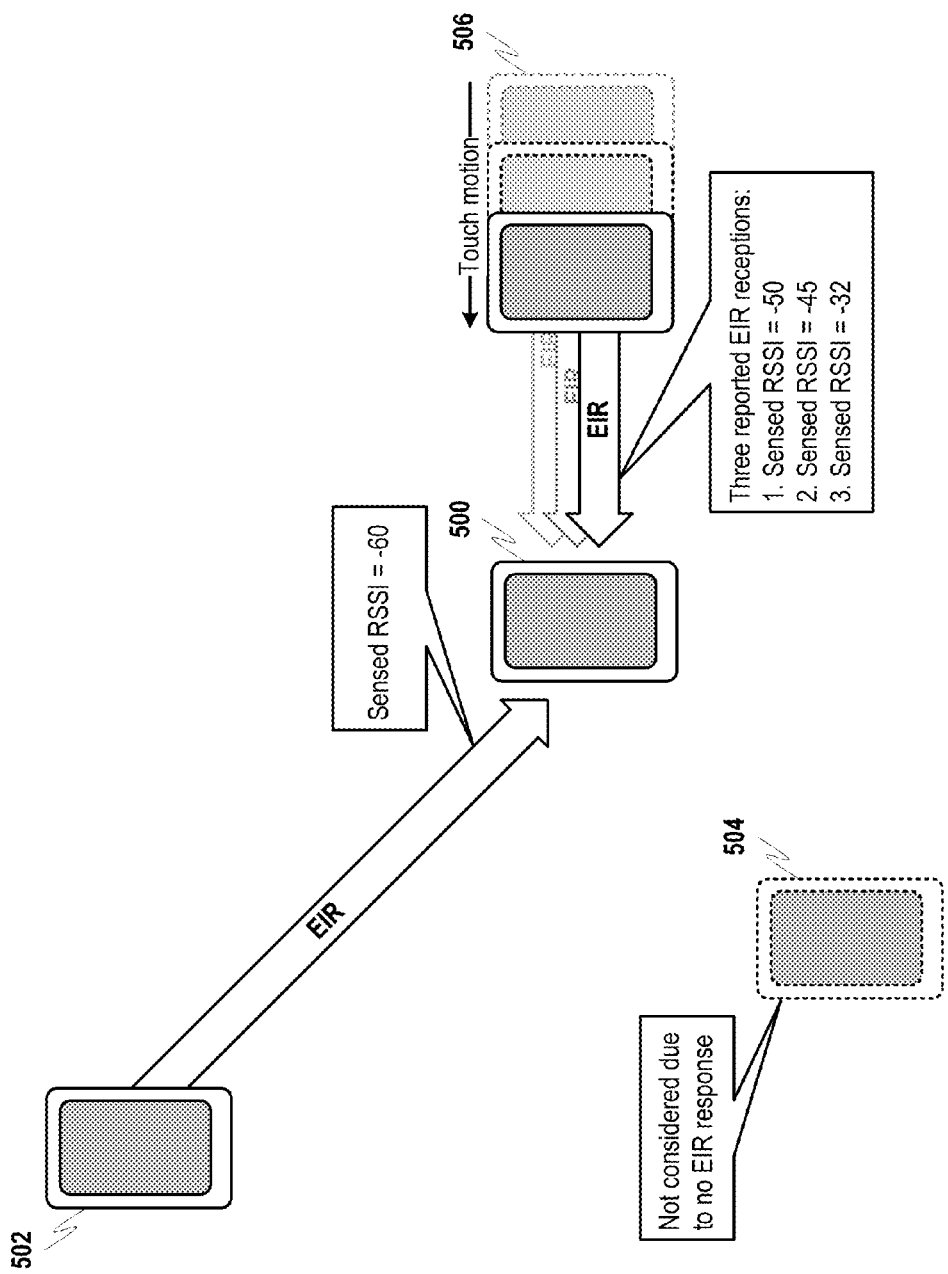
FIG. 7 discloses another example of signal strength measurement in accordance with at least one embodiment of the present invention.

It may also be possible to determine when apparatuses are being moved closer to the other apparatus in order to "touch" apparatuses, or alternatively, when an inquiring apparatus is being moved closer to other apparatuses. An example of the first instance is disclosed in FIG. 7. In the disclosed example a Bluetooth controller in apparatus 500 may receive multiple inquiry responses from apparatuses 502 to 506. The response from apparatus 504 does not provide an EIR, and so Bluetooth controller may only report the first of a multiple of responses to host software stack as HCI Inquiry Event that may contain RSSI of the received response. This may allow apparatus 500 to handle the response in a "standard" manner, wherein the apparatus is displayed in UI 302 in order based on the sensed RSSI. In instances where EIR responses are received (e.g., from apparatuses 502 and 506), the Bluetooth controller may report each received EIR as a HCI EIR Event. This becomes important where apparatus 506 in FIG. 7 is being moved closed to apparatus 500. Because the controller also reports an RSSI for each EIR response, it is easy to track the changing RSSI levels and the movement of apparatus 506. When the measured RSSI satisfies predetermined response criteria (e.g., including the RSSI being measured to be at or above a predetermined level), the corresponding apparatus may be selected for touch-related operations (e.g., expedited connection establishment). In accordance with at least one embodiment of the present invention, apparatus sensor information (e.g., movement or acceleration sensors in the apparatus) may be utilized to determine when, for example, an inquiring apparatus has stopped moving, which may indicate in the apparatus is when touch measurements may be taken (e.g., when the user of the apparatus has stopped moving the apparatus towards another apparatus in order to touch the two apparatuses). Apparatuses having high enough RSSI in this position may be selected for touch-related processing.

In FIG. 7 apparatus 500 is an inquiring device. Apparatuses 502 and 506 respond with EIR and apparatus 504 responds with the normal IR. The BT controller of apparatus 500 reports these responses to its host which also has Touch selection software running Typical response criteria, as shown in FIG. 7, may include RSSI values being sensed above certain fixed threshold value, like −30 dBm. Sensing a response packet having −30 dBm will then trigger device selection while −31 dBm will not. It may also be possible that responding apparatuses may send Tx power information in EIR packet, as this is an existing feature in the Bluetooth specification v4.0. In instances where Tx power information is available in the EIR packet, the predetermined response criteria may include an adjustable RSSI threshold value that accounts for the Tx power. For example, the threshold value may be set at 30 dBm below the EIR Tx power, so that if the Tx power level in an FHS packet is +20 dBm then the threshold value that will trigger selection will be the FHS packet being measured at −10 dBm, or 30 dBm below of Tx power level. Secondly, to ensure that apparatuses are maintained in close proximity, the predetermined response criteria may require that more than one EIR must have a sensed RSSI for the corresponding FHS packet at or above a threshold value. In addition different thresholds could be used for different phases, for example, first the threshold value may be set above −45 dBm to select one or more candidate apparatuses and then second, finally deciding the threshold value may be set above −30 dBm.

Another filtering factor for selecting apparatuses for touch operations may be based on services available in a responding apparatus. For example, EIR packets may contain service level information, and so only responses above certain measured signal strength level and from device(s) supporting certain types of BT services (e.g. RSSI above −30 dBm and OBEX file transfer supported) may be selected for touch-related operations. Multiple apparatuses (e.g. two apparatuses next to each other) may be selected, triggering expedited connection establishment between the inquiring device and the two selected apparatuses. It may also be possible to select multiple devices by touching them one after another, wherein all addresses that satisfy the predetermined response criteria (e.g., that have an RSSI above set threshold) may be selected in order. In this way you can easily select a distribution group containing more than one apparatus.

It may also be important for a responding apparatus to make sure that an inquiring apparatus is within touching range, and not some other device that is far away, in order to ensure that communication is established with the desired apparatus. There are several possibilities for checking touch proximity. A connection between the devices may be created after the touch and responding apparatuses determine if the sensed RSSI levels meet predetermined response criteria corresponding to a close proximity device. The responding apparatus may utilize vendor specific commands that provide RSSI information for the particular connection. If it is determined that the predetermined response criteria have been satisfied, data may be accepted from the inquiring apparatus. Otherwise the connection can be refused. Operating using this type of check may cause some delay in the connection establishment process because the apparatuses have to be in close proximity all the time. It may be also possible for a responding apparatus equipped for touch operations to be configured to measure the RSSI of all received ID packets in certain instances (e.g., when a touch mode is active). Having this information at the outset would speed up the process as the connection does not have to be established before checking the RSSI of ID packets received from a particular inquiring apparatus (e.g., the responding apparatus does not transmit response messages to the particular inquiring apparatus). In accordance with at least one embodiment of the present invention, a touch mode may be initiated by the motion of touching the devices. In particular, the motion may be registered by acceleration sensor, which may activate the touch mode by performing steps such as activating Bluetooth in the apparatus and putting the apparatus in a visible Bluetooth pairing mode for a certain duration (e.g., 10 s). The inquiring apparatus may then transmit ID packets received by the responding apparatus which accepts the connection (e.g., if it is determined to satisfy predetermined response criteria).

Figure 8:
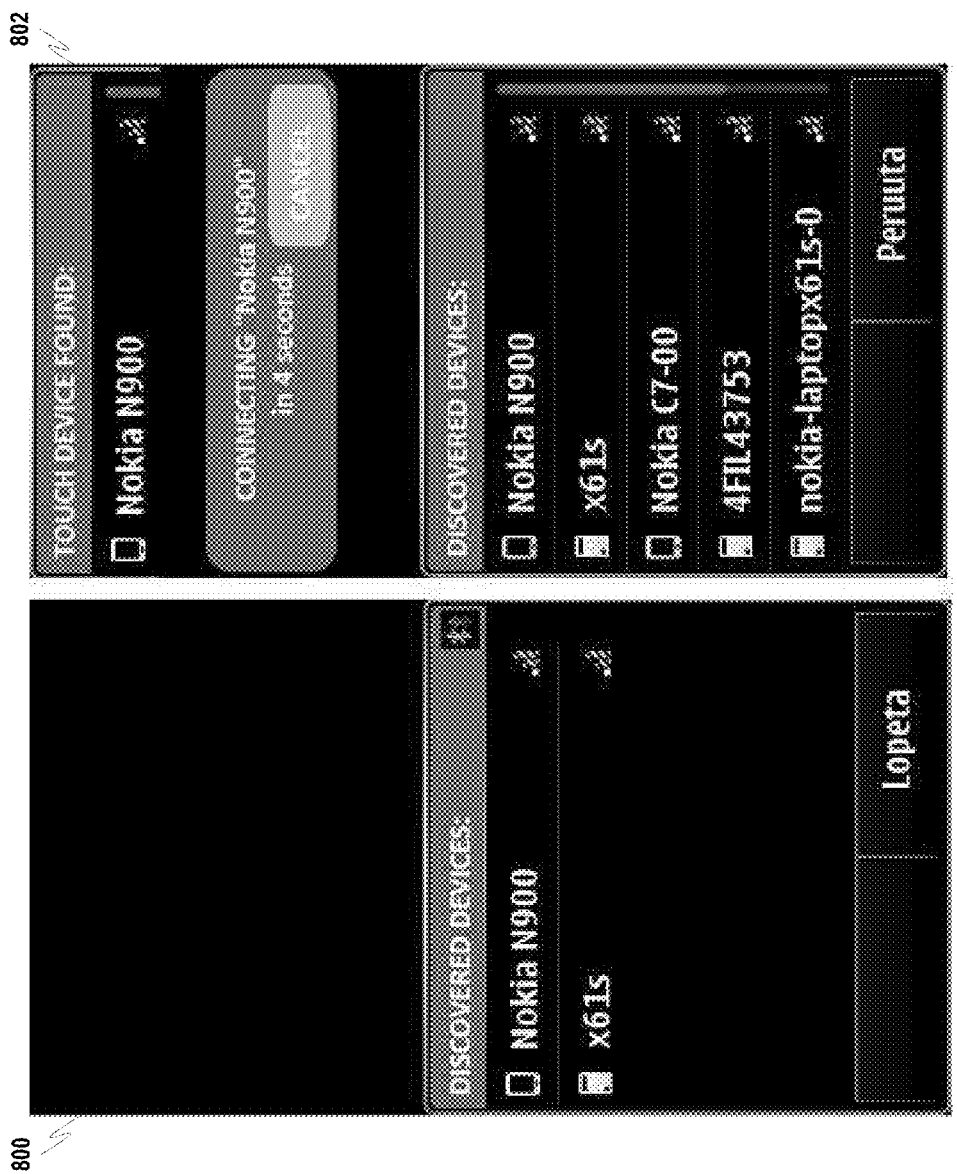
FIG. 8 discloses a modified example user interface display indication in accordance with at least one embodiment of the present invention.

FIG. 8 discloses an example user interface response in accordance with at least one embodiment of the present invention. Similar to FIG. 3, UI 800 displays the beginning of the inquiry process when information is first being received by an inquiring apparatus. Some of the response apparatuses (e.g., "Nokia N900" and "x61s") are already being discovered and displayed for the user at this stage. In UI 802, a touch apparatus has been identified. In accordance with the previously disclosed example implementations, some determination has occurred within the inquiring apparatus that resulted in a finding that the responding apparatus "Nokia N900" meets the predetermined response criteria, which has resulted in the apparatus being selected for touch operations. In this example touch operations includes expedited connection establishment, which is shown in UI 802 where an indication is presented to the user that the apparatus "Nokia N900" will be automatically connected to the inquiring apparatus within 4 seconds. It is important to note that UI 802 and the particular indications presented therein are merely for the sake of explanation in the present disclosure. The various embodiments of the present invention are not limited specifically to the activities disclosed in FIG. 8, and thus, other actions related to wireless connection establishment between two or more apparatuses may also be executed as a result of determining that the responding apparatus satisfies the predetermined response criteria.

V. Example Implementations of Multiple Selection Criteria

As previously disclosed, touch inquiry is a method where wireless connections to another apparatus may be established via touch interaction. While this functionality may greatly simplify how users create apparatus-to-apparatus links, the previously disclosed embodiments of the present invention focused more on one-on-one apparatus interactions. For example, when a desired apparatus is found, inquiry is stopped and further operation is done with selected device.

However, sometimes a desired operational scenario requires interaction with more than one apparatus. For example, a user may want to listen to music provided by a source device (e.g., multimedia storage apparatus) to a different listening device (e.g., wireless headphones) but may want to configure and/or control the interaction via a third device (e.g., a mobile apparatus). In another example scenario, multiple users may desire to play a game wherein each user may participate using their own mobile apparatuses that are interconnected via short-range wireless communication. These example use scenarios require configuring communications in multiple apparatuses, which given existing technology may require users to be aware of communication parameters (e.g., transports, addresses, etc.) for each apparatus, and to manually configure each apparatus individually, which can be extremely cumbersome for novice and even experienced users. In the instance of communication mediums like Bluetooth, after an inquiry apparatuses may be selected from an inquiry results list. However, apparatus selection may be hard or even impossible when the apparatuses may not be readily recognizable by their Bluetooth names. In addition, the entire inquiry must complete so that the names can be seen in the device display.

In particular, existing Bluetooth communication configuration tools would require multiple device selection to be performed through normal inquiry and manual selection based on inquiry results that are displayed for a user. The user would then select desired apparatuses from a menu of discovered devices. This process not only requires the user to identify each apparatus based on its displayed Bluetooth name, which may be difficult where similar apparatuses may be using identical default Bluetooth names (e.g., established during manufacture), the user may also have to understand which apparatuses are capable of providing the interaction, functionality, etc. that the user desires. In view of this complexity and required user knowledge, the conventional selection approach may be difficult to integrate into end-user applications (e.g., as an automated menu-driven procedure) since communication configuration, inquiry, and selection would make the process complex, and users would still need to be able to recognize apparatuses for selection.

Figure 9:
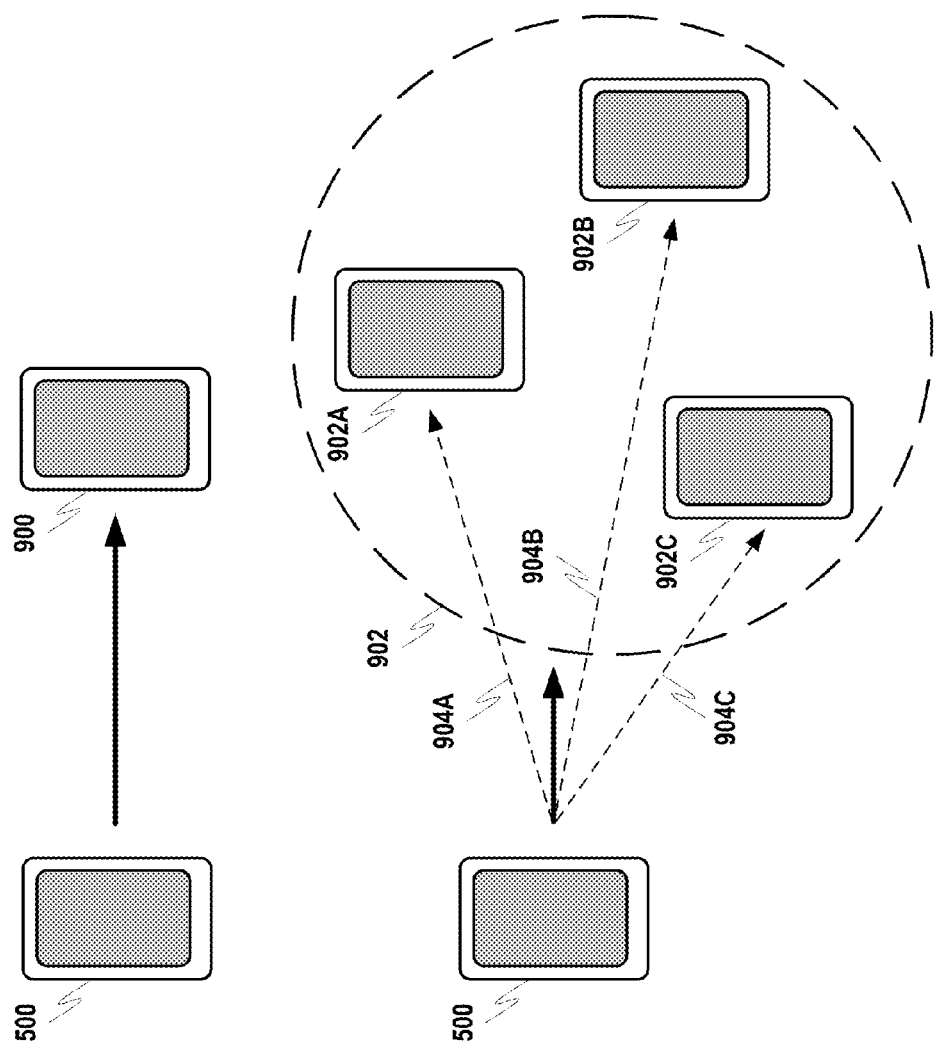
FIG. 9 discloses examples of individual and group touch processes in accordance with at least one embodiment of the present invention.

In accordance with at least one embodiment of the present invention, the selection of a single apparatus or multiple apparatuses may be accomplished via simple touch processes as disclosed in FIG. 9. In a first example operation, apparatus 500 may be moved towards target device 900, and through this touch operation one or both apparatuses may sense that the other apparatus is within touch range and expedite connection establishment (e.g., may automatically become wirelessly linked with little or no user prompting). FIG. 9 further discloses an example wherein apparatus 500 touches group 902 (e.g., apparatuses 902A, 902B and 902C as shown at 904A, 904B and 904C). While apparatuses 902A, 902B and 902C are shown as members of group 902, a group relationship is not required in order to touch multiple apparatuses. Multiple selection may encompass any situation where more than one apparatus is selected by touch, and the definition of a group may simply describe why the particular apparatuses are being touched. The predetermined response criteria employed above (e.g., in regard to the various embodiments of the present invention pertaining to device-to-device interaction) may also be used in multiple selection. For example, the RSSI of certain signals (e.g., EIR signals) received from apparatuses 902A-902C (e.g., as part of the discovery process) sensed to be over a predefined or adaptive threshold level may cause one or more of apparatuses 902A-902C to be selected by apparatus 500.

Using this approach apparatus inquiry and selection may be automated, and thus, greatly simplified for apparatus users. Discovered apparatuses associated with transmissions (e.g., Bluetooth EIR signals) that are sensed to have an RSSI over a predetermined threshold may automatically be stored in a "selected" devices list in a user apparatus (e.g., apparatus 500), and wireless connections may be established to these apparatuses with little or no user intervention (e.g., a user may be prompted to intervene only if the connection establishment operation should be aborted). Multiple selection via touch inquiry requires only host side implementation. In Bluetooth the host controller interface (HCI) may be utilized to input multiple selection criteria (e.g., a number of apparatuses to select, the particular apparatuses/apparatus types/functionalities that form a group, etc.) and for receiving inquiry and/or selection results. Multiple selection may also be enabled at the application level when application operation requires multiple apparatuses. The application may indicate multiple selection criteria with a "set device limit" parameter, etc. In addition, the application could also indicate service types that are needed to be supported, etc.

As disclosed above, multiple selection criteria may define apparatuses that should be selected for operation (e.g., in a group). Multiple selection may be triggered manually, may be triggered automatically (e.g., after the selection of a certain apparatus, type of apparatus) or may be triggered in a combined manual and automated process (e.g., after another apparatus is touched the user apparatus prompts the user as to whether group selection should be initiated based on the apparatus that was touched). Multiple selection criteria may define apparatuses to be selected in a multitude of contexts. For example, multiple selection criteria may define functionality that is required in order for a group of apparatuses to operate. Selection may be complete for the group when apparatuses enabled to provide all of the functionality defined in the multiple selection criteria have been selected. Multiple selection criteria may also define a certain number of apparatuses to be selected. Selection may then be complete when the certain number of apparatuses have been selected. Other characteristics may also be utilized to define the apparatuses to be selected including, for example, a group of certain users or types of users, apparatuses in a certain geographic area, apparatuses with a certain security configuration, etc.

Figure 10:
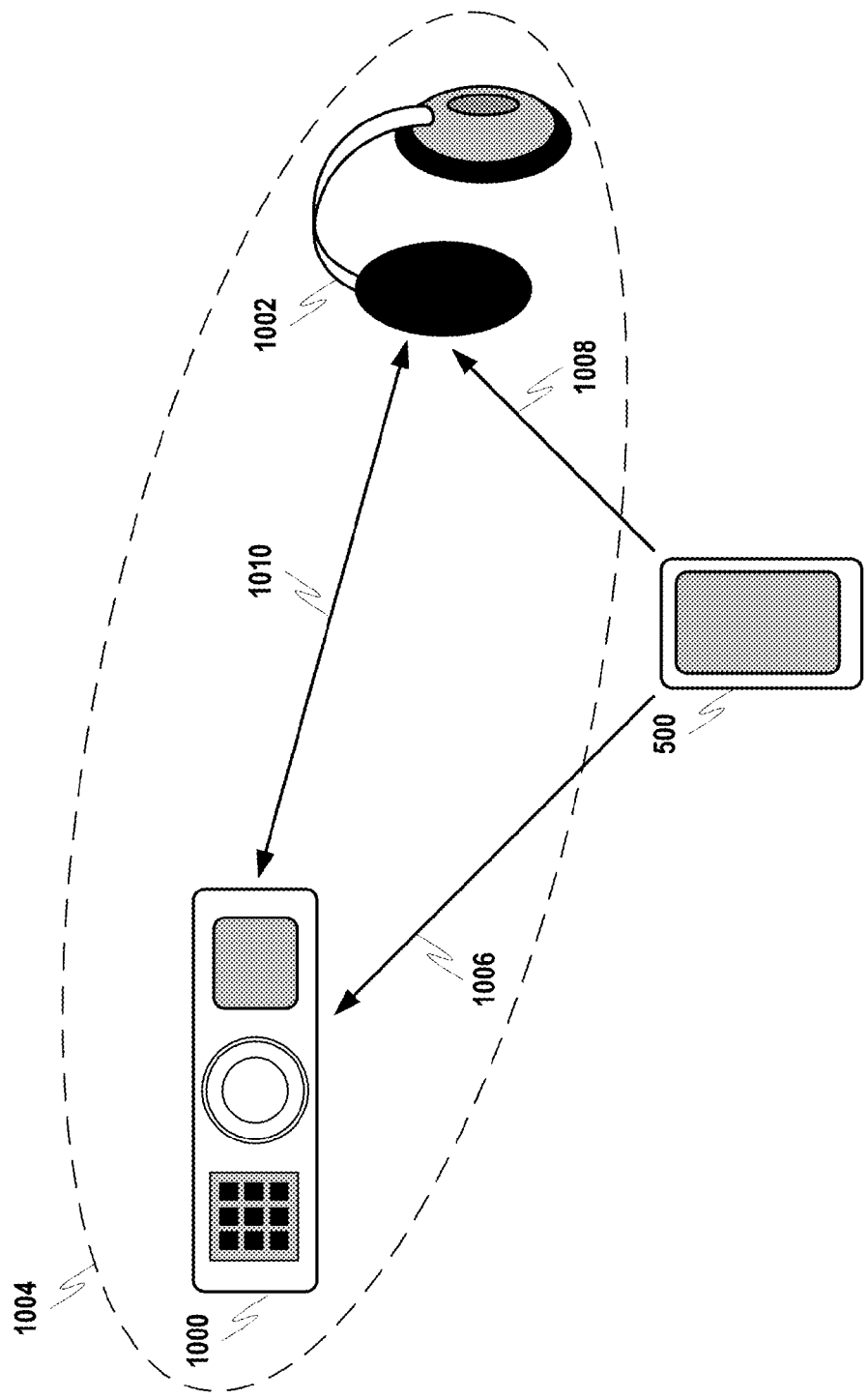
FIG. 10 discloses an example of apparatus selection based on multiple selection criteria in accordance with at least one embodiment of the present invention.

An example of inquiry and multiple selection is disclosed in FIG. 10. A user may desire to listen to (and/or watch) media stored on an apparatus 1000 that supports, for example, Advanced Audio Distribution Protocol (A2DP), and at least the audio portion of the media may need to be routed to another apparatus 1002 (e.g., wireless speakers, headphones, etc.) for audio reproduction. In addition there may be a third apparatus 500 which may be utilized to establish the connection via touch inquiry and to possibly control the operation of apparatuses 1000 and 1002. In accordance with at least one embodiment of the present invention, apparatuses 1000 and 1002 may be comprised within group 1004. Group 1004 may identify specific apparatuses (e.g., by Bluetooth name or other device identification) or may identify the apparatuses by type and/or functionality (a multimedia data source, an apparatus configured for audio reproduction, apparatuses that support A2DP, etc.) The provision of functionality that an apparatus supports may easy to implement, in accordance with at least one embodiment of the present invention, in that the functionality information may be included in the EIR packets whose strength is already being measured to determine if apparatuses are within touch range, and would not cause delay in device discovery. The functionality information may be delivered via a "selection parameters" interface. It is also possible to indicate that in EIR packets that certain apparatuses are already grouped together, which may be saved as multiple selection criteria. Selection information may be reported in "report devices" phase. A user may indicate to apparatus 500 that the selection of group 1004 is desired, and based on the multiple selection criteria for group 1004 apparatus 500 may then guide the user to select (e.g., via touch) a Bluetooth and A2DP enabled multimedia source (e.g., apparatus 1000) followed by prompting the user to select a similarly configured audio reproduction apparatus (e.g., 1002). Alternatively, the user may be prompted to touch the apparatuses in no particular order, or the user may first touch at least one of apparatus 1000 and apparatus 1002, and then based on the selection apparatus 500 may recognize that group 1004 may be appropriate for these devices and may, for example, prompt the user to confirm as such. Any apparatuses that are determined to be in touch range but cannot provide the functionality identified in the multiple selection criteria may be identified as invalid and/or may be ignored if discovered again. Multiple selection may continue, for example, until apparatuses that are enabled to provide all of the functionality identified in the multiple selection criteria are touched.

In the example of FIG. 10 apparatus 500 may perform a touch operation with both apparatus 1000 and 1002 as shown at 1006 and 1008, respectively. After selection is complete, apparatus 500 may perform a secondary operation wherein connection establishment information for apparatus 1002 is then sent to apparatus 1000 in order to establish direct connection 1010. In such a configuration apparatus 500 may no longer be active in group 1004. For example, upon receipt of the connection establishment information for apparatus 1002, apparatus 1000 may just establish a wireless connection to apparatus 1002 and start transmitting multimedia data (e.g., music) for audio reproduction by apparatus 1002. In another example configuration, a similar operation may occur where apparatus 1000 and 1002 interact directly, but apparatus 500 also maintains wireless connections to one or both of the apparatus to control operations (e.g., song selection, play/pause, volume, muting, etc.). In this way the user may use apparatus 500 like a remote control for controlling both apparatus 1000 and 1002 even though both of these apparatuses are also interacting directly. Another example of this type of multiple selection criteria may comprise transmitting audio information from a car stereo system to wireless headset, and then possibly muting the car speakers using a mobile device. The mobile device may select the car stereo and the headphones based on multiple selection criteria, provide connection establishment information to each apparatus, and then automatically instruct the car stereo to mute the car speakers without having to deal with a more complex configuration process that may be complicated by having to configure each apparatus individually, if even possible given the limited control features that may exist in each apparatus.

Figure 11:
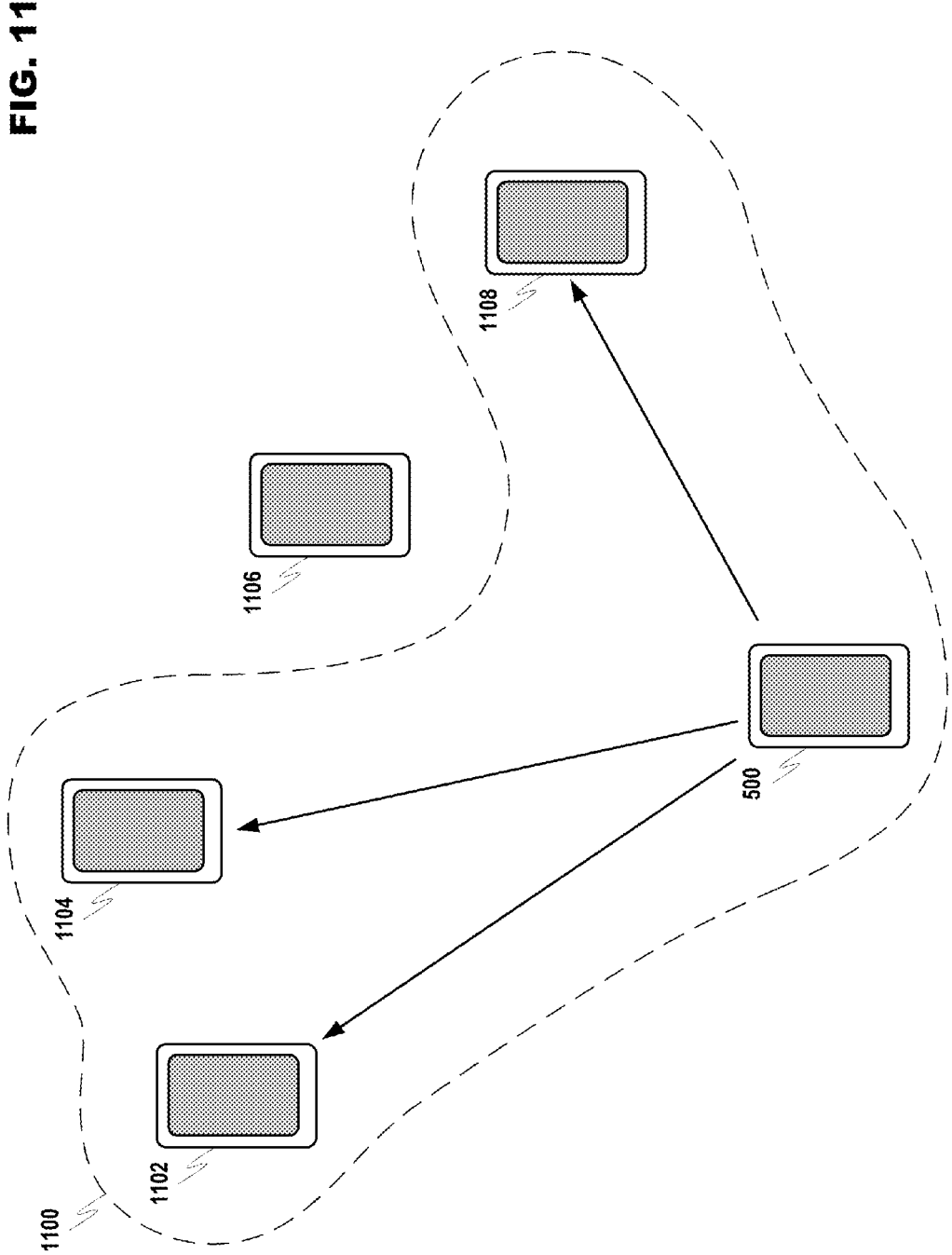
FIG. 11 discloses another example of apparatus selection based on multiple selection criteria in accordance with at least one embodiment of the present invention.

Another example implementation in accordance with at least one embodiment of the present invention is disclosed in FIG. 11. In this example the multiple selection criteria may be based on the amount of apparatuses to select. If this is "normal" (e.g., one to one) touch inquiry the amount would be one. In instances where the amount of apparatuses to select is not known beforehand, a "selection done" trigger (e.g., a manual stop instituted by the user) may be used to stop the inquiry when the desired number of apparatuses have been selected. In the example of FIG. 11, a user of apparatus 500 may desire to select apparatuses 1102, 1104 and 1108 (e.g., in order to form group 1100). In view of the previously disclosed embodiments of the present invention, the user may just touch each desired apparatus in succession to select apparatuses individually. However, additional beneficial features may be incorporated when utilizing multiple selection criteria. For example, connection establishment may be delayed until after multiple selection is complete in order to avoid unnecessary communication that may cause discovery delay and wasted apparatus resources when a complete group cannot be selected (e.g., there are not enough apparatuses within range to select). In a gaming scenario, a user may touch the apparatuses of users to join a cooperative gaming group, and after all of the apparatuses have been touched the user may finalize the selection. Selected apparatus parameters (addresses) may then be delivered to the game application, and the application can establish wireless connections to the individual apparatuses. In the example of FIG. 11 the user of apparatus 500 may desire to play a game with the users of apparatuses 1102, 1104 and 1108, but not including apparatus 1106 which is also within communication range of the other apparatuses. In a first phase the user may touch apparatus 1102 and it becomes selected. The user may then select apparatuses 1104 and 1108 via touch. Selection may continue until all multiple selection criteria are satisfied (e.g., the amount of apparatuses defined in the multiple selection criteria are selected or selection is terminated manually by the user of apparatus 500). Apparatus 1106 is not selected. In instances where two or more of the apparatuses (e.g., apparatuses 1104 and 1106) are same type/model, it would be difficult to select the correct device if the apparatuses are using the same Bluetooth name (e.g., a default name created during manufacture). Touch helps to avoid this situation in that a user does not have to identify the apparatus by name in a list of discovered devices, but instead allows the user to select the correct apparatus through physical association/gesture.

The various embodiments of the present invention may be enhanced through the addition input from sensors (e.g., acceleration, physical contact, etc.) to improve the accuracy of selection via touch. For example, the sensors may allow for adaptive RSSI level adjustment. In particular, if an apparatus is touched during a multiple selection process, but the sensed RSSI of the signal from the touched apparatus does not satisfy the threshold level due to, for example, the Bluetooth antenna being blocked or distant from the touched apparatus, information provided from an acceleration sensor in the sensing apparatus may clarify that the touching apparatus has stopped. Selection may then be adjusted to select the apparatus associated with the signal having the highest sensed RSSI level that stays substantially constant between consecutive responses.

Figure 12:
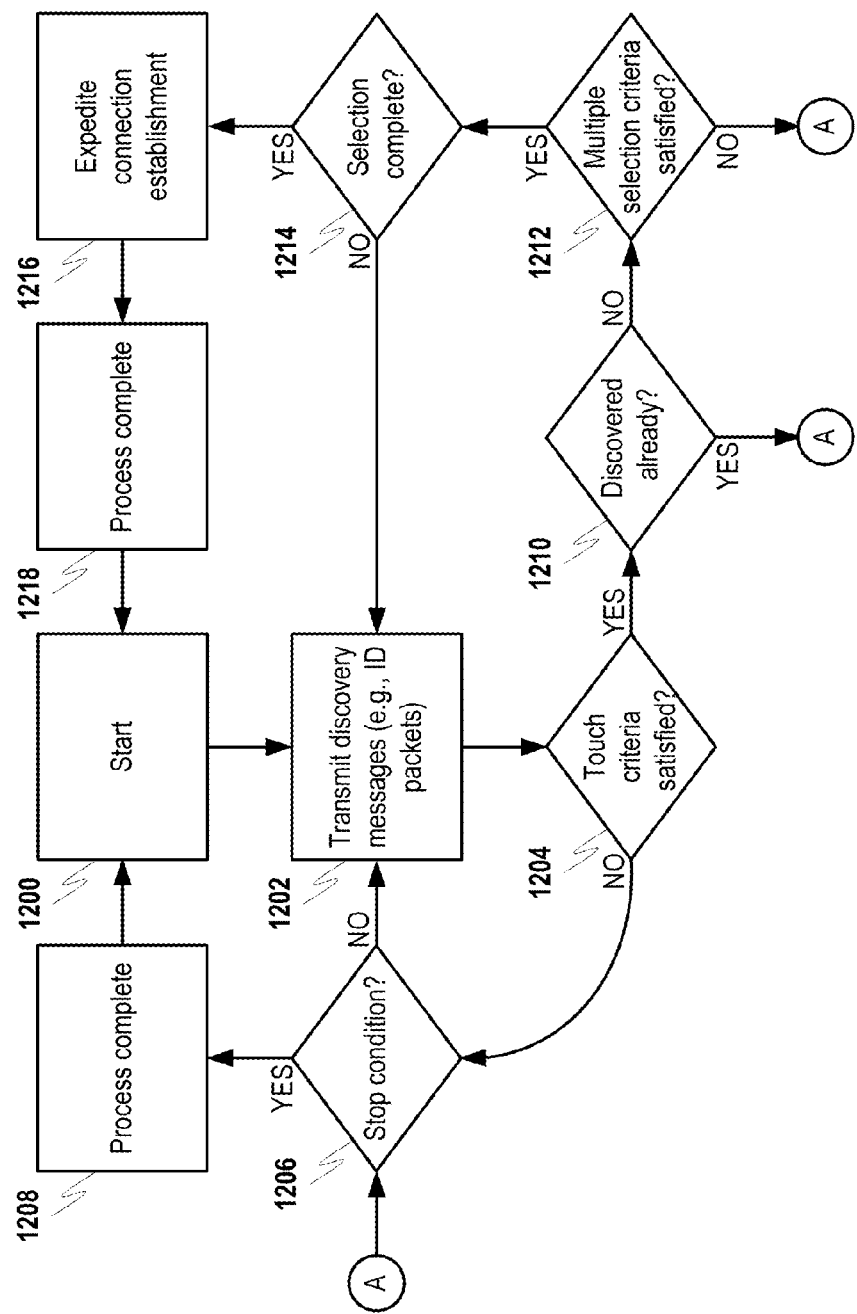
FIG. 12 discloses a flowchart of an example communication process from the transmitting perspective in accordance with at least one embodiment of the present invention.

In accordance with at least one embodiment of the present invention, a flowchart of an example process from the perspective of an apparatus performing multiple selection is disclosed in FIG. 12. The process may initiate in step 1200 and may proceed to step 1202 wherein discovery messages (e.g., ID packets in terms of Bluetooth communication) may be transmitted from the selecting apparatus. The selecting apparatus may then receive messages responding to the discovery messages. In accordance with the various example implementations of the present invention disclosed above, as a part of touch determination the selecting apparatus may determine whether the response messages satisfy predetermined response criteria including, for example, a determination as to whether the response messages comprise EIR packets, and if determined to comprise EIR packets, whether the signal strength (e.g., RSSI) of the EIR packets is sensed to be at or above a predetermined level. The resulting determination of whether these conditions are satisfied occurs in step 1204, where if it is determined that the response does not contain EIR packets, or the measured signal strength of the EIR packets is not at or above the predetermined level, the process may move to step 1206 to determine whether a stop condition has occurred. Stop conditions may be based on user interaction (e.g., the user of the selecting apparatus manually ends discovery) or automated conditions such as a timeout, a number of response messages being received, etc. If it is determined in step 1206 that a stop condition does not exist then the process may return to step 1202 to continue with the discovery process. Otherwise, the process may be complete in step 1208 and may reinitiate in step 1200 in order to prepare for the next time discovery messages are transmitted in step 1202.

If in step 1204 a determination is made that response messages received in the selecting apparatus comprise EIR packets that satisfy the predetermined response criteria (e.g., a touch interaction has occurred), then in step 1210 a further determination may be made as to whether the responding apparatus has already been discovered. If, for example, the Bluetooth ID of the responding apparatus was already stored in the selecting apparatus then the responding apparatus may be ignored and/or the selecting apparatus may inform the user that the responding apparatus was already discovered, and the process may return to step 1206 to determine whether a stop condition has occurred. Otherwise, the process may proceed to step 1212 to determine if the responding apparatus satisfies multiple selection criteria. As disclosed above, multiple selection criteria may define how multiple apparatuses are selected based on, for example, an amount of apparatuses to be selected, specific apparatuses to be selected, an identification of apparatus types to be selected, an identification of functionality to be provided by selected apparatuses, etc. The determination of whether the responding apparatus satisfies the multiple selection criteria may comprise determining, for example, whether a responding apparatus is specifically identified in the multiple selection criteria, whether additional apparatuses need to be selected in order to satisfy an amount of apparatuses defined in the multiple selection criteria, whether a responding apparatus is enabled to provide functionality still needed per the multiple selection criteria, etc. If the responding apparatus is determined not to satisfy the multiple selection criteria, the process may again return to step 1206 in order to determine whether a stop condition has occurred.

If the responding apparatus is determined to satisfy the multiple selection criteria, the process may proceed to step 1214 where a further determination may be made as to whether selection is complete. The determination of whether selection is complete may be based on the multiple selection criteria and the apparatuses already selected. For example, if the amount of apparatuses defined the multiple selection criteria have been selected then selection is complete. Selection may also be complete if all apparatuses identified in a multiple selection criteria have been discovered, if apparatuses have been selected corresponding to all of the apparatus types defined in the multiple selection criteria, if apparatuses have been selected to provide all of the functionality defined in the multiple selection criteria, etc. If in step 1214 multiple selection is determined not to be complete, then the process may return to step 1202 to continue discovery.

Otherwise, the process may move to step 1216 wherein the selecting apparatus may expedite connection establishment. Expediting connection establishment may comprise the selection of apparatuses, and the establishment of connections between the selected apparatuses, based on touch operations. There is no need for a user to know the identities of the apparatuses that are interacting or the configuration information needed to make the connections. In this way the connection configuration may be automated based on user's behavior (e.g., touch) in terms of the apparatus or group selection. Traditional menu-based, stepwise, connection configuration as implemented manually by a user may be replaced with intuitive, behavior-based selection and connection forming. In addition, the formation of derivative connections (e.g., directly between selected apparatuses) and/or configurations may also be automated. In more particular examples, expediting connection establishment may comprise the selecting apparatus establishing wired or wireless connections to some or all of the selected apparatuses (e.g., possibly in conjunction with a user notification that connections will be established automatically unless manually aborted). Connection establishment information may also be provided to one or more of the selected apparatuses so that the selected apparatuses may establish wired or wireless connections directly to other apparatuses (e.g., to other selected apparatuses.) Other connectivity-related technology information may also be delivered as part of the connection establishment information, and may be used for connection establishment in a similar manner to how this information was used in the selection process (e.g., allowing selected apparatuses to make their own determination about connecting to other apparatuses based on the connectivity-related technology information). The process may then be complete in step 1218 and may reinitiate in step 1200 in order to prepare for the next time discovery messages are transmitted in step 1202.

The various embodiments of the present invention are not limited only to the examples disclosed above, and may encompass other configurations or implementations.

For example, embodiments of the present invention may encompass an apparatus comprising means for transmitting discovery messages, means for receiving one or more messages responding to the discovery messages, means for determining if any of the one or more response messages satisfy predetermined response criteria, means for, if it is determined that any of the one or more response messages satisfy the predetermined response criteria, determining if any of the one or more response messages are associated with apparatuses that satisfy multiple selection criteria, means for, if it is determined that any of the one or more response messages are associated with apparatuses that satisfy the multiple selection criteria, selecting the apparatuses that satisfy the multiple selection criteria, and means for expediting connection establishment for the selected apparatuses.

At least one other example embodiment of the present invention may include electronic signals that cause an apparatus to transmit discovery messages, receive one or more messages responding to the discovery messages, determine if any of the one or more response messages satisfy predetermined response criteria, if it is determined that any of the one or more response messages satisfy the predetermined response criteria, determine if any of the one or more response messages are associated with apparatuses that satisfy multiple selection criteria, if it is determined that any of the one or more response messages are associated with apparatuses that satisfy the multiple selection criteria, select the apparatuses that satisfy the multiple selection criteria, and expedite connection establishment for the selected apparatuses.

Accordingly, it will be apparent to persons skilled in the relevant art that various changes in forma and detail can be made therein without departing from the spirit and scope of the invention. The breadth and scope of the present invention should not be limited by any of the above-described example embodiments, but should be defined only in accordance with the following claims and their equivalents.

What is claimed:

1. A method, comprising:
   transmitting discovery messages from an apparatus;
   receiving response messages responding to the discovery messages at the apparatus from one or more responding apparatuses;
   determining by the apparatus if a predetermined response criteria is satisfied, the predetermined response criteria comprising receiving a plurality of response messages, each of which includes a frequency hopping synchronization packet and an extended inquiry response packet, having a measured signal strength at or above a predetermined signal strength level, wherein the plurality of response messages are received from a single responding apparatus and the extended inquiry response packet comprises additional information regarding the single responding apparatus, the predetermined signal strength level correlating with the apparatus being located close to a tracking range from the single responding apparatus;
   if it is determined by the apparatus that the predetermined response criteria is satisfied by a responding apparatus, determining by the apparatus if the plurality of response messages associated with the responding apparatus that satisfies the predetermined response criteria also satisfies multiple selection criteria, the multiple selection criteria comprising additional information regarding the responding apparatus that satisfies the predetermined response criteria matching a predefined functionality;
   if it is determined by the apparatus that the multiple selection criteria is satisfied, selecting the responding apparatus that satisfies the multiple selection criteria; and
   expediting connection establishment for the selected apparatus.

2. The method of claim 1, wherein the predetermined response criteria comprises the plurality of response messages including certain types of messages, at least one of the certain types of messages having the measured signal strength at or above a predetermined signal strength level.

3. The method of claim 1, wherein the multiple selection criteria comprises selecting a certain number of apparatuses.

4. The method of claim 1, wherein the multiple selection criteria comprises selecting apparatuses configured to provide certain functionality.

5. The method of claim 1, further comprising determining by the apparatus, after selecting the responding apparatus that satisfies the multiple selection criteria, whether selection is complete prior to expediting connection establishment for the selected apparatus.

6. The method of claim 1, wherein expediting connection establishment comprises establishing wireless connections between at least one of the apparatus and one or more selected apparatuses, or directly between selected apparatuses.

7. The method of claim 6, wherein expediting connection establishment directly between the selected apparatuses comprises transmitting connection establishment information to at least one of the selected apparatuses.

8. A computer program product comprising computer executable program code recorded on a non-transitory computer readable storage medium, the computer executable program code comprising:
   code configured to cause an apparatus to transmit discovery messages;
   code configured to cause the apparatus to receive response messages responding to the discovery messages from one or more responding apparatuses;
   code configured to cause the apparatus to determine if a predetermined response criteria is satisfied, the predetermined response criteria comprising receiving a plurality of response messages, each of which includes a frequency hopping synchronization packet and an extended inquiry response packet, having a measured signal strength at or above a predetermined signal strength level, wherein the plurality of response messages are received from a single responding apparatus and the extended inquiry response packet comprises additional information regarding the single responding apparatus, the predetermined signal strength level correlating with the apparatus being located close to a tracking range from the single responding apparatus;
   code configured to cause the apparatus to, if it is determined that the predetermined response criteria is satisfied by a responding apparatus, determine if the plurality of response messages associated with the responding apparatus that satisfies the predetermined response criteria also satisfies multiple selection criteria, the multiple selection criteria comprising additional information regarding the responding apparatus that satisfies the predetermined response criteria matching a predefined functionality;
   code configured to cause the apparatus to, if it is determined that the multiple selection criteria is satisfied, select the apparatus that satisfies the multiple selection criteria; and
   code configured to cause the apparatus to expedite connection establishment for the selected apparatus.

9. The computer program product of claim 8, wherein the predetermined response criteria comprises the plurality of response messages including certain types of messages, at least one of the certain types of messages having the measured signal strength at or above a predetermined signal strength level.

10. The computer program product of claim 8, wherein the multiple selection criteria comprises selecting a certain number of apparatuses.

11. The computer program product of claim 8, wherein the multiple selection criteria comprises selecting apparatuses configured to provide certain functionality.

12. The computer program product of claim 8, further comprising code configured to cause the apparatus to determine, after selecting the responding apparatus that satisfies the multiple selection criteria, whether selection is complete prior to expediting connection establishment for the selected apparatus.

13. The computer program product of claim 8, wherein the code configured to cause the apparatus to expedite connection establishment comprises code configured to cause the apparatus to establish wireless connections between at least one of the apparatus and one or more selected apparatuses, or directly between selected apparatuses.

14. The computer program product of claim 13, wherein the code configured to cause the apparatus to expedite connection establishment directly between the selected apparatuses comprises code configured to cause the apparatus to transmit connection establishment information to at least one of the selected apparatuses.

15. An apparatus, comprising:
   at least one processor; and
   at least one memory including executable instructions, the at least one memory and the executable instructions being configured to, in cooperation with the at least one processor, cause the apparatus to perform at least the following:

transmit discovery messages;

receive response messages responding to the discovery messages from one or more responding apparatuses;

determine if a predetermined response criteria is satisfied, the predetermined response criteria comprising receiving a plurality of response messages, each of which includes a frequency hopping synchronization packet and an extended inquiry response packet, having a measured signal strength at or above a predetermined signal strength level, wherein the plurality of response messages are received from a single responding apparatus and the extended inquiry response packet comprises additional information regarding the single responding apparatus, the predetermined signal strength level correlating with the apparatus being located close to a tracking range from the single responding apparatus;

if it is determined that the predetermined response criteria is satisfied by a responding apparatus, determine if the plurality of response messages associated with the responding apparatus that satisfies the predetermined response criteria also satisfies multiple selection criteria, the multiple selection criteria comprising additional information regarding the responding apparatus that satisfies the predetermined response criteria matching a predefined functionality;

if it is determined that the multiple selection criteria is satisfied, select the responding apparatus that satisfies the multiple selection criteria; and expedite connection establishment for the selected apparatus.

16. The apparatus of claim 15, wherein the predetermined response criteria comprises the plurality of response messages including certain types of messages, at least one of the certain types of messages having the measured signal strength at or above a predetermined signal strength level.

17. The apparatus of claim 15, wherein the multiple selection criteria comprises selecting a certain number of apparatuses.

18. The apparatus of claim 15, wherein the multiple selection criteria comprises selecting apparatuses configured to provide certain functionality.

19. The apparatus of claim 15, further comprising the at least one memory and the executable instructions being configured to, in cooperation with the at least one processor, cause the apparatus to determine, after selecting the responding apparatus that satisfies the multiple selection criteria, whether selection is complete prior to expediting connection establishment for the selected apparatus.

20. The apparatus of claim 15, wherein the at least one memory and the executable instructions being configured to, in cooperation with the at least one processor, cause the apparatus to expedite connection establishment comprises the at least one memory and the executable instructions being configured to, in cooperation with the at least one processor, cause the apparatus to establish wireless connections between at least one of the apparatus and selected apparatuses, or directly between selected apparatuses.

21. The apparatus of claim 20, wherein the at least one memory and the executable instructions being configured to, in cooperation with the at least one processor, cause the apparatus to expedite connection establishment directly between the selected apparatuses comprises the at least one memory and the executable instructions being configured to, in cooperation with the at least one processor, cause the apparatus to transmit connection establishment information to at least one of the selected apparatuses.

22. A system, comprising:

an apparatus; and one or more other apparatuses;

the apparatus transmitting discovery messages and receiving response messages responding to the discovery messages from the one or more other apparatuses;

the apparatus further determining if a predetermined response criteria is satisfied, the predetermined response criteria comprising receiving a plurality of response messages, each of which includes a frequency hopping synchronization packet and an extended inquiry response packet, having a measured signal strength at or above a predetermined signal strength level, wherein the plurality of response messages are received from a single responding apparatus and the extended inquiry response packet comprises additional information regarding the single responding apparatus, the predetermined signal strength level correlating with the apparatus being located close to a tracking range from the single responding apparatus, and if it is determined that the predetermined response criteria is satisfied, the apparatus further determining if the single responding apparatus associated with the plurality of response messages satisfying the predetermined response criteria satisfies multiple selection criteria, the multiple selection criteria comprising additional information regarding the single responding apparatus matching a predefined functionality;

the apparatus further, if it is determined that the multiple selection criteria is satisfied, selecting the associated apparatus that satisfies the multiple selection criteria and expediting connection establishment for the selected apparatus.

* * * * *